US010614939B2

(12) United States Patent
Saddik et al.

(10) Patent No.: US 10,614,939 B2
(45) Date of Patent: Apr. 7, 2020

(54) HARD MAGNETIC COMPOSITIONS FROM IRON OXIDE FINES AND METHODS FOR MAKING SAME

(71) Applicant: Saudi Basic Industries Corporation, Riyadh (SA)

(72) Inventors: Mohamed Bahgat Saddik, Jubail (SA); Fazal-Ur-Rehman Awan, Jubail (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 4 days.

(21) Appl. No.: 15/112,749

(22) PCT Filed: Jan. 29, 2015

(86) PCT No.: PCT/IB2015/050693
§ 371 (c)(1),
(2) Date: Jul. 20, 2016

(87) PCT Pub. No.: WO2015/114570
PCT Pub. Date: Aug. 6, 2015

(65) Prior Publication Data
US 2016/0343485 A1 Nov. 24, 2016

Related U.S. Application Data

(60) Provisional application No. 61/934,586, filed on Jan. 31, 2014, provisional application No. 62/043,701, filed on Aug. 29, 2014.

(51) Int. Cl.
*H01F 1/10* (2006.01)
*C01G 49/00* (2006.01)
*H01F 41/02* (2006.01)

(52) U.S. Cl.
CPC ........... *H01F 1/10* (2013.01); *C01G 49/0036* (2013.01); *H01F 41/0253* (2013.01);
(Continued)

(58) Field of Classification Search
CPC .............................. C01G 49/0036; H01F 1/10
See application file for complete search history.

(56) References Cited

U.S. PATENT DOCUMENTS 3,597,357 A 8/1971 Cochardt ................... 252/62.63
3,887,478 A 6/1975 Eadie
(Continued)

FOREIGN PATENT DOCUMENTS

CN 1450022 10/2003
CN 1724461 1/2006
(Continued)

OTHER PUBLICATIONS

Luo. Preparation of Strontium Ferrite Powders by Mechanochemical Process. Applied Mechanics and Materials Online: Oct. 24, 2011 ISSN: 1662-7482, vols. 110-116, pp. 1736-1740.*
(Continued)

*Primary Examiner* — Matthew E. Hoban
(74) *Attorney, Agent, or Firm* — Norton Rose Fulbright US LLP

(57) ABSTRACT

Disclosed herein are compositions and methods of making a hard magnetic material from iron oxide fines, the hard magnetic material having a general formula $MFe_xO_y$. In one aspect, the method comprises a) providing an iron oxide fine; b) providing a metal carbonate of a general formula $M_x(CO_3)_y$; c) mixing the iron oxide fine and the metal carbonate to form a mixture; d) calcining the mixture of the iron oxide fine and the metal carbonate; wherein M is a divalent metal ion.

16 Claims, 14 Drawing Sheets

(52) U.S. Cl.
CPC ...... *C01P 2002/72* (2013.01); *C01P 2004/03* (2013.01); *C01P 2006/42* (2013.01)

(56) References Cited

U.S. PATENT DOCUMENTS

| | | | |
|---|---|---|---|
| 5,061,412 A | 10/1991 | Okumori et al. | ............. 264/428 |
| 6,139,766 A * | 10/2000 | Taguchi | .............. C04B 35/2641 |
| | | | 252/62.57 |
| 2006/0145118 A1* | 7/2006 | He | ..................... C01G 45/1221 |
| | | | 252/62.59 |

FOREIGN PATENT DOCUMENTS

| | | |
|---|---|---|
| CN | 101205138 | 6/2008 |
| CN | 102757235 | 10/2012 |
| FR | 2089928 | 1/1972 |
| JP | H03123004 | 5/1991 |
| JP | H11228142 | 8/1999 |

OTHER PUBLICATIONS

Ataie et al., "Synthesis of ultra-fine particles of strontium hexaferrite by a modified co-precipitation method", *J. Eur. Ceram. Soc.*, 21: 1951-1955, 2001.

Brito et al., "$SrFe_{12}O_{19}$ prepared by the proteic sol-gel process", *Physica B*, 384: 91-93, 2006.

Chen et al., "Synthesis of strontium ferrite nanoparticles by coprecipitation in the presence of polyacrylic acid", *Mater. Res. Bull.*, 37: 801-810, 2002.

Coey, "Magnetic materials", *J. Alloys Compd.* 326: 2-6, 2001.

Collomb et al., "Crystal Structure and Cobalt Location in the W-Type Hexagonal Ferrite [Ba] $Co_2$-W", *Phys. Stat. sol.* (A) 96: 385-395, 1986.

Ghasemi et al., "Structural and electromagnetic characteristics of substituted strontium hexaferrite nanoparticles", *J. Magn. Magn. Mater.* 320: 1167-1172, 2008.

Guo et al., "Preparation and magnetic properties of $SrFe_{12}O_{19}$ particles prepared by the salt-melt method", *J. Magn. Magn. Mater.*, 175: 333-336, 1997.

Gutfleisch et al., "Magnetic Materials and Devices for the 21$^{st}$ Century: Stronger, Lighter, and More Energy Efficient", *Adv Mater*, 23: 821-842, 2011.

How et al., "Wave Propagation in Ferrite Involving Planar Anisotropy—Theory and Experiment", *IEEE Trans. Magn.*, 41(8): 2349-2354, 2005.

International Search Report and Written Opinion for PCT/IB2015/050693, dated Jun. 10, 2015.

Iqbal et al., "Synthesis, physical, magnetic and electrical properties of Al—Ga substituted co-precipitated nanocrystalline strontium hexaferrite", *J. Magn. Magn. Mater.* 320: 881-886, 2008.

Kaczmarek et al., "XRD and VSM study of ball-milled $SrFe_{12}O_{19}$ powder", *J. Magn. Magn. Mater.*, 177-181: 921-922, 1998.

Kazin et al., "Formation of submicron-sized $SrFe_{12-x}Al_xO_{19}$ with very high coercivity", *J. Magn. Magn. Mater.*, 320: 1068-1072, 2008.

Ketov et al., "Structure and magnetic properties of nanocrystalline $SrFe_{12}O_{19}$ alloy produced by high-energy ball milling and annealing", *J. Magn. Magn. Mater.*, 300: e479-e481, 2006.

Morisako et al., "Properties of Ba-ferrite/AlN double layered films for perpendicular magnetic recording media", *J. Magn. Magn. Mater.*, 242-245: 304-310, 2002.

Narang et al., "Microwave dielectric properties of M-Type barium, calcium and strontium hexa-ferrite substituted with Co and Ti", *Journal of Ceramic Processing Research*, 7(2): 113-116, 2006.

Office Action issued in Chinese Patent Application No. 201580006152.5, dated Jul. 20, 2018.

Office Action issued in GCC Patent Application No. GC 2015-28845, dated Jul. 30, 2018.

Onreabroy et al., "Study of strontium ferrites substituted by lanthanum on the structural and magnetic properties", *Ceramics International* 38S: S415-S419, 2012.

Pankov et al., "Fine hexaferrite particles for perpendicular recording prepared by the coprecipitation method in the presence of an inert component", *J. Magn. Magn. Mater.*, 120: 69-72, 1993.

Qiao et al., "The magnetic properties of strontium hexaferrites with La—Cu substitution prepared by SHS method", *J. Magn. Magn. Mater.*, 318: 74-78, 2007.

Rafferty et al., "Sintering behaviour of cobalt ferrite ceramic", *Ceramics International*, 34: 15-21, 2008.

Wang et al., "A study of Sm-substituted SrM magnets sintered using hydrothermally synthesized powders", *J. Magn. Magn. Mater.*, 298:122-131, 2006.

Wu et al., "Effect of doping $SiO_2$ on high-frequency magnetic properties for W-type barium ferrite", *J. Appl. Phys.*, 95(8): 4235-4239, 2004.

Zi et al., "Structural and magnetic properties of $SrFe_{12}O_{19}$ hexaferrite synthesized by a modified chemical co-precipitation method", *Journal of Magnetism and Magnetic Materials*, 320: 2746-2751, 2008.

Gao et al., "Advanced Materials Testing Instrument Elementary lessons: 1418, duxiu, coercive force and particle size of grains" *Advanced Materials Testing Instrument Elementary Lessons*, Tsinghua University Press, 2008, p. 100. (English Translation).

Office Action issued in Corresponding Chinese Patent Application No. 201580006152.5, dated Mar. 7, 2019. (English Translation).

Wang et al., "Process and Technology for the Production of Ferrite" Chongqing University Press, 2013, 89-90. (English Translation).

* cited by examiner

HARD MAGNETIC COMPOSITIONS FROM IRON OXIDE FINES AND METHODS FOR MAKING SAME

CROSS-REFERENCE TO RELATED APPLICATIONS

This application is a national phase application under 35 U.S.C. § 371 of International Application No. PCT/IB2015/050693 filed Jan. 29, 2015, which claims the benefit of and priority to U.S. Provisional Application No. 61/934,586 filed Jan. 31, 2014, and U.S. Provisional Application No. 62/043,701 filed Aug. 29, 2014. The entire contents of each of the above-referenced disclosures are specifically incorporated herein by reference without disclaimer.

FIELD OF INVENTION

The present invention relates to a method for making a hard magnetic material from iron oxide fines, the hard magnetic material having a general formula $MFe_xO_y$, the method comprising: providing an iron oxide fine; providing a metal carbonate of a general formula $M_x(CO_3)_y$; mixing the iron oxide fine and the metal carbonate to form a mixture; and calcining the mixture of the iron oxide fine and the metal carbonate; wherein M is a divalent metal ion.

BACKGROUND OF THE INVENTION

Hard ferrites are magnetic ceramics which retain permanent magnetism and find application in both electronic and non-electronic sectors. Today, ferrite magnets have the largest usage in terms of tonnage in energy-related applications, which is attributed to their low price. For many applications, a permanent magnet is the best choice because it provides a constant field without the continuous expenditure of electric power and without generation of heat. Strontium hexaferrite ($SrFe_{12}O_{19}$, Sr-ferrite) is one well-known material for permanent magnets. It is a hard magnet with high coercivity, and can be used as permanent magnets, recording media, telecommunication, as well as in microwave components, higher-frequency components, and magneto-optical devices.

In another aspect, the quantity of iron oxide by-products are increasing rapidly with the rising demand for steel production. These by-products are underutilized and are often disposed of. The safe disposal of these by-products is expensive and continues to be a serious concern in many countries throughout the world. Thus, there remains a strong need in the art for alternative methods of making hard magnet materials using iron oxide by-products.

SUMMARY OF THE INVENTION

In accordance with the purposes of the invention, as embodied and broadly described herein, the invention relates to a method for making a hard magnetic material of a general formula $MFe_xO_y$, the method comprising: a) providing an iron oxide fine; b) providing a metal carbonate of a general formula $M_x(CO_3)_y$; c) mixing the iron oxide fine and the metal carbonate to form a mixture; d) calcining the mixture of the iron oxide fine and the metal carbonate; wherein M is a divalent metal ion.

In a further exemplary aspect, the invention relates to a method for making a hard magnetic material of a general formula $MFe_xO_y$, the method comprising: a) providing an iron oxide fine; b) providing a metal carbonate comprising $SrCO_3$; c) mixing the iron oxide fine and the metal carbonate to form a mixture; d) calcining the mixture of the iron oxide fine and the metal carbonate.

In a further exemplary aspect, the invention relates to a method for making a hard magnetic material of a general formula $MFe_xO_y$, the method comprising: a) providing an iron oxide fine; b) providing a metal oxide of a general formula $M_xO_y$; c) mixing the iron oxide fine and the metal oxide to form a mixture; d) calcining the mixture of the iron oxide fine and the metal oxide; wherein M is a divalent metal ion.

In a further exemplary aspect, the invention relates to a method for making a hard magnetic material of a general formula $MFe_xO_y$, the method comprising: a) providing an iron oxide fine; b) providing a metal carbonate salt of a general formula $M_x(CO_3)_y$; c) mixing the iron oxide fine and the metal carbonate to form a mixture; d) calcining the mixture of the iron oxide fine and the metal oxide; wherein M is a divalent metal ion.

In further aspects, the invention also relates to methods of using the disclosed hard magnetic material and articles comprising the disclosed hard magnetic material.

Additional aspects of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION OF THE INVENTION

Figure 1A:
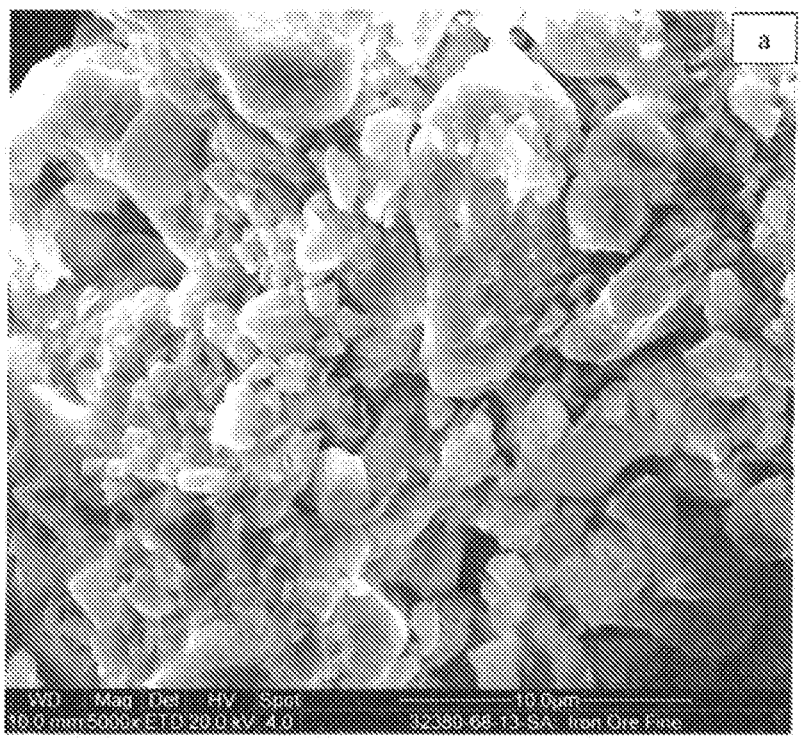
FIGS. 1A and 1B show SEM micrographs of iron oxide fines by-products used to prepare the hard magnetic materials of the present invention.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

All publications mentioned herein are incorporated herein by reference to disclose and describe the methods and/or materials in connection with which the publications are cited.

A. DEFINITIONS

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this invention belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an iron oxide fine" includes mixtures of two or more iron oxide fines.

As used herein, the term "combination" is inclusive of blends, mixtures, alloys, reaction products, and the like.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

References in the specification and concluding claims to parts by weight, of a particular element or component in a composition or article, denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent ("wt %") of a component, unless specifically stated to the contrary, is based on the total weight of the formulation or composition in which the component is included. For example if a particular element or component in a composition or article is said to have 8% by weight, it is understood that this percentage is relative to a total compositional percentage of 100% by weight.

As used herein, the term or phrase "effective," "effective amount," or "conditions effective to" refers to such amount or condition that is capable of performing the function or property for which an effective amount is expressed. As will be pointed out below, the exact amount or particular condition required will vary from one aspect to another, depending on recognized variables such as the materials employed and the processing conditions observed. Thus, it is not always possible to specify an exact "effective amount" or "condition effective to." However, it should be understood that an appropriate effective amount will be readily determined by one of ordinary skill in the art using only routine experimentation.

Compounds are described using standard nomenclature. For example, any position not substituted by any indicated group is understood to have its valence filled by a bond as indicated, or a hydrogen atom. A dash ("-") that is not between two letters or symbols is used to indicate a point of attachment for a substituent. For example, —CHO is attached through carbon of the carbonyl group. Unless defined otherwise, technical and scientific terms used herein have the same meaning as is commonly understood by one of skill in the art to which this invention belongs.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. METHODS FOR MAKING A HARD MAGNETIC MATERIAL

As briefly described above, the present disclosure relates, in one aspect, to a method for making a hard magnetic material. In one aspect, the hard magnetic material has a general formula $MFe_xO_y$. In a further aspect, the disclosure provides a method for making a hard magnetic material of a general formula $MFe_xO_y$, the method comprising: a) providing an iron oxide fine; b) providing a metal carbonate of a general formula $M_x(CO_3)_y$; c) mixing the iron oxide fine and the metal carbonate to form a mixture; d) calcining the mixture of the iron oxide fine and the metal carbonate; wherein M is a divalent metal ion.

In a further aspect, disclosed herein is a method for making a hard magnetic material of a general formula $MFe_xO_y$, the method comprising: a) providing an iron oxide fine; b) providing a metal carbonate comprising $SrCO_3$; c) mixing the iron oxide fine and the metal carbonate to form a mixture; d) calcining the mixture of the iron oxide fine and the metal carbonate.

In a further aspect, disclosed herein is a method for making a hard magnetic material. In one aspect, the hard magnetic material has a general formula $MFe_xO_y$. In a further aspect, the disclosure provides a method for making a hard magnetic material of a general formula $MFe_xO_y$, the method comprising: a) providing an iron oxide fine; b) providing a metal oxide of a general formula $M_xO_y$; c) mixing the iron oxide fine and the metal oxide to form a mixture; d) calcining the mixture of the iron oxide fine and the metal oxide; wherein M is a divalent metal ion.

In a further aspect, disclosed herein is a method for making a hard magnetic material of a general formula $MFe_xO_y$, the method comprising: a) providing an iron oxide fine; b) providing a metal carbonate salt of a general formula $M_x(CO_3)_y$; c) mixing the iron oxide fine and the metal carbonate to form a mixture; d) calcining the mixture of the iron oxide fine and the metal carbonate; wherein M is strontium.

In various aspects, the iron oxide fine is provided as a by-product of an iron processing or iron making process. In yet further aspects, the iron oxide fine is iron oxide fine produced from iron ore pellets used in the iron making process in Saudi Iron and Steel Company (HADEED).

In one aspect, the iron oxide comprises hematite ($Fe_2O_3$; iron (III) oxide), magnetite ($Fe_3O_4$; triiron tetroxide), limonite (FeO(OH)._n_($H_2O$); hydrated iron (III) oxide hydroxide), siderite ($FeCO_3$; iron (II) carbonate), iron pyrite ($FeS_2$; iron (II) disulfide), goethite (FeO(OH); iron (III) oxide hydroxide), or combinations thereof.

In one aspect, the iron oxide fine comprises iron in an amount ranging from 63.0% by weight to 67.5% by weight, based on the total weight of the iron oxide fine, including exemplary values of 63% by weight, 64% by weight, 65% by weight, 66% by weight, and 67% by weight. In still further aspects, the iron oxide fine can comprise iron in a range derived from any two of the above listed exemplary values. For example, the iron oxide fine can comprise iron in an amount ranging from 64% by weight to 66.0% by weight, based on the total weight of the iron oxide fine. In still another aspect, the iron oxide fine comprises iron in an amount ranging from 63.0% by weight to 67.0% by weight, based on the total weight of the iron oxide fine.

In one aspect, the iron oxide fine comprises iron oxide ($Fe_2O_3$) in an amount ranging from greater than 90% by weight to 96% by weight, based on the total weight of the iron oxide fine, including exemplary values of 91% by weight, 92% by weight, 93% by weight, 94% by weight, and 95% by weight. In still further aspects, the iron oxide fine can comprise iron oxide in a range derived from any two of the above listed exemplary values. For example, the iron oxide fine can comprise iron oxide ($Fe_2O_3$) in an amount ranging from 92% by weight to 94.0% by weight, based on the total weight of the iron oxide fine. In still another aspect, the iron oxide fine comprises iron oxide ($Fe_2O_3$) in an amount ranging from 90% by weight to 96% by weight, based on the total weight of the iron oxide fine.

In one aspect, the iron oxide fine comprises silicon oxide in an amount ranging from greater than 0% by weight to 3.0% by weight, based on the total weight of the iron oxide fine, including exemplary values of 1.0% by weight and 2.0% by weight. In still further aspects, the iron oxide fine can comprise silicon oxide in a range derived from any two of the above listed exemplary values.

In one aspect, the iron oxide fine comprises calcium oxide in an amount ranging from greater than 0% by weight to 2.5% by weight, based on the total weight of the iron oxide fine, including exemplary values of 1.0% by weight, 1.5% by weight, and 2.0% by weight. In still further aspects, the iron oxide fine can comprise calcium oxide in a range derived from any two of the above listed exemplary values.

In one aspect, the iron oxide fine comprises magnesium oxide in an amount ranging from greater than 0% by weight to about 1.0% by weight, based on the total weight of the iron oxide fine, including exemplary values of 0.2% by weight, 0.4% by weight. 0.6% by weight, and 0.8% by weight. In still further aspects, the iron oxide fine can comprise a range derived from any two of the above listed exemplary values.

In one aspect, the iron oxide fine comprises aluminum oxide in an amount ranging from greater than 0% by weight to about 1.0% by weight, based on the total weight of the iron oxide fine, including exemplary values of 0.2% by weight, 0.4% by weight. 0.6% by weight, and 0.8% by weight. In still further aspects, the oxide fine can comprise a range derived from any two of the above listed exemplary values.

In one aspect, the iron oxide fine comprises sulfur in an amount ranging from greater than 0% by weight to 0.03% by weight, based on the total weight of the iron oxide fine, including exemplary values of 0.01% by weight and 0.02% by weight.

In one aspect, the method comprises providing a metal oxide of a general formula $M_xO_y$. In a further aspect, the method comprises providing a metal carbonate of a general formula $M_x(CO_3)_y$. In a yet further aspect, the metal M is a divalent metal ion. In a still further aspect, M is strontium. In a yet further aspect, the metal oxide is provided as a carbonate salt. In an even further aspect, the metal carbonate is $SrCO_3$. In a still further aspect, the metal oxide is SrO. In a still further aspect, the metal oxide or carbonate is provided in at least a stoichiometric amount relative to the amount of the iron oxide fine. As one of skill in the art will appreciate, the x values and y values will depend on the metal chosen. For example, in one aspect, when the metal is strontium, x is 1 and y is 1.

In the hard magnetic material comprises iron in an amount ranging from 58.0% by weight to 63.0% by weight, based on the total weight of the hard magnetic material, including exemplary values of 61.0% by weight, 62.0% by weight, and 63.0% by weight. In still further aspects, the hard magnetic material can comprise iron in a range derived from any two of the above listed exemplary values. For example, the hard magnetic material can comprise iron in an amount ranging from 60% by weight to 63.0% by weight, based on the total weight of the hard magnetic material.

In one aspect, the hard magnetic material comprises iron oxide ($Fe_2O_3$) in an amount ranging from greater than 83% by weight to 90.0% by weight, based on the total weight of the hard magnetic material, including exemplary values of 84.0% by weight, 85.0% by weight, 86% by weight, 87% by weight, 88% by weight, and 89% by weight. In still further aspects, the hard magnetic material can comprise iron oxide ($Fe_2O_3$) in a range derived from any two of the above listed exemplary values. For example, the hard magnetic material can comprise iron oxide ($Fe_2O_3$) in an amount ranging from 83% by weight to 90.0% by weight, based on the total weight of the hard magnetic material. In still another aspect, the hard magnetic material comprises iron oxide ($Fe_2O_3$) in an amount ranging from 84% by weight to 90% by weight, based on the total weight of the hard magnetic material.

In one aspect, the hard magnetic material comprises SrO in an amount ranging from greater than 3% by weight to 10% by weight, based on the total weight of hard magnetic material, including exemplary values of 4% by weight, 5% by weight, 6% by weight, 7% by weight, 8% by weight 9% by weight, and 10% by weight. In still further aspects, the hard magnetic material can comprise SrO in a range derived from any two of the above listed exemplary values. For example, the hard magnetic material can comprise SrO in an amount ranging from 6% by weight to 9% by weight, based on the total weight of the hard magnetic material. In still another aspect, the hard magnetic material comprises SrO in an amount ranging from 4% by weight to 9% by weight, based on the total weight of the hard magnetic material.

In one aspect, the hard magnetic material is a hard ferrite. In a further aspect, the hard ferrite is a hexagonal ferrite.

In one aspect, the hard magnetic material is hexagonal ferrites; M is strontium; and $Fe_xO_y$ is $Fe_{12}O_{19}$. In a further aspect, the hard magnetic material comprises from greater than 3 wt % to about 10 wt % SrO and from greater than 83 wt % to about 90 wt % $Fe_2O_3$.

In various aspects, the metal oxide/iron oxide ratio can be any desired ratio. In one aspect, the metal oxide/iron oxide ratio is a stoichiometric ratio. In a further aspect, the metal oxide/iron oxide ratio is at least about 1:5, including exemplary ratios of 1:6, 1:7, 1:8, 1:9, 1:10, 1:11, 1:12, 1:13, and 1:14. In a further aspect, the metal oxide/iron oxide ratio can be in a range derived from any two of the above listed exemplary values. For example, in one aspect, the metal oxide/iron oxide ratio is from about 1:10 to about 1:12.

In a further aspect, Sr/Fe mixing ratio is a stoichiometric ratio. In a still further aspect, the Sr/Fe ratio is at least about 1:5, including exemplary ratios of 1:6, 1:7, 1:8, 1:9, 1:10, 1:11, 1:12, 1:13, and 1:14. In a yet further aspect, the Sr/Fe ratio can be in a range derived from any two of the above listed exemplary values. For example, in one aspect, the Sr/Fe ratio is from about 1:10 to about 1:12. In a further aspect, SrO and $Fe_2O_3$ is provided in a Sr/Fe ratio of at least about 1:5, including exemplary ratios of 1:6, 1:7, 1:8, 1:9, 1:10, 1:11, 1:12, 1:13, and 1:14. In a still further aspect, the Sr/Fe ratio can be in a range derived from any two of the above listed exemplary values. For example, in one aspect, the Sr/Fe ratio is from about 1:10 to about 1:12.

In various aspect, the hard magnetic material has improved properties in physical, mechanical, chemical, and metallurgical properties.

In one aspect, the hard magnetic material has an intrinsic coercivity ($_iH_c$) of at least 100 kA/m, including exemplary values of 110, 120, 130, 150, 170, 180, 190, 200, 210, 220, 230, 250, 270, 280, 300, 320, 350, 370, 380, 400, 420, 430, 450, 470, 480, 500, 520, 530, and 540 kA/m. In a further aspect, the hard magnetic material can have an intrinsic coercivity ($_iH_c$) in a range derived from any two of the above listed exemplary values. For example, in one aspect, the hard magnetic material has an intrinsic coercivity ($_iH_c$) in the range of from 100 to 550 kA/m. In a further aspect, the hard magnetic material has an intrinsic coercivity ($_iH_c$) in the range of from 200 to 550 kA/m. In a yet further aspect, the hard magnetic material has an intrinsic coercivity ($_iH_c$) in the range of from 100 to 500 kA/m.

In one aspect, the hard magnetic material has a saturation magnetization (Ms) of at least about 50 $Am^2/kg$, including exemplary values of about 60, 70, 80, 90, 100, 110, 120, 130, 140, 150, 160, 170, 180, and 190 $Am^2/kg$. In a further aspect, the hard magnetic material can have a saturation magnetization (Ms) in a range derived from any two of the above listed exemplary values. For example, in one aspect, the hard magnetic material can have a saturation magnetization (Ms) in the range of about 50 to about 100 $Am^2/kg$. In a further aspect, the hard magnetic material can have a saturation magnetization (Ms) in the range of about 50 to about 150 $Am^2/kg$.

In various aspects, the stored energy in the hard magnetic material of the present invention can be referred to as the magnet performance or energy product (BH). In a further aspect, the energy product value (BH) is typically measured in units of megagauss-oersteds (MGOe).

In one aspect, the hard magnetic material has an energy product value (BH) at 300 K of at least about 1.0 MGOe, including exemplary values of about 1.1, 1.2, 1.3, 1.4, 1.5, 1.6, 1.7, 1.8, 1.9, 2.0, 2.1, 2.3, 2.4, 2.5, 2.6, 2.7, 2.8, 2.9, and 3.0 MGOe. In a further aspect, the hard magnetic material can have an energy product value (BH) at 300 K in a range derived from any two of the above listed exemplary values. For example, in one aspect, the hard magnetic material can have an energy product value (BH) at 300 K of from at least about 1.0 to about 2.5 MGOe, or from about 2.0 to about 2.5 MGOe. In another aspect, the hard magnetic material can have an energy product value (BH) at 300 K of about 2.3 MGOe.

In one aspect, the hard magnetic material has an energy product value (BH) at 4.2 K of at least about 1.0 MGOe, including exemplary values of about 1.1, 1.2, 1.3, 1.4, 1.5, 1.6, 1.7, 1.8, 1.9, 2.0, 2.1, 2.3, 2.4, 2.5, 2.6, 2.7, 2.8, 2.9, and 3.0 MGOe. In a further aspect, the hard magnetic material can have an energy product value (BH) at 4.2 K in a range derived from any two of the above listed exemplary values. For example, in one aspect, the hard magnetic material can have an energy product value (BH) at 4.2 K of from at least about 1.0 to about 2.5 MGOe, or from about 2.0 to about 2.5 MGOe. In another aspect, the hard magnetic material can have an energy product value (BH) at 4.2 K of about 2.3 MGOe In addition to the foregoing components, the disclosed hard magnetic material can optionally comprise a balance amount of one or more additive materials ordinarily incorporated in composite iron compositions of this type, with the proviso that the additives are selected so as to not significantly adversely affect the desired properties of the hard magnetic material. Combinations of additives can be used. Such additives can be mixed at a suitable time during the mixing of the components for forming the hard magnetic materials.

C. METHODS OF MANUFACTURING THE HARD MAGNETIC MATERIAL

In various aspects, the hard magnetic material of the present invention can be manufactured by various methods. In one aspect, the hard magnetic material of the present invention can be blended with the aforementioned ingredients by a variety of methods involving admixing of the ingredients with any additional additives desired in the formulation. For example, the ingredients can be mixed using conventional methods such as with an intensive mixer, such as a R02 Eirich mixer or any other mixing equipment.

In one aspect, the invention provides a method for manufacturing a hard magnetic material, the method comprising: a) providing an iron oxide fine; b) providing a metal oxide of a general formula $M_xO_y$; c) mixing the iron oxide fine and the metal oxide to form a mixture; d) calcining the mixture of the iron oxide fine and the metal oxide; wherein M is a divalent metal ion. In some aspects, no crushing step is required for the iron oxide fine. In other aspects, no pre-heating step is required for the iron oxide fine.

In another aspect, the invention provides a method for manufacturing a hard magnetic material, the method comprising: a) providing an iron oxide fine; b) providing a metal carbonate of a general formula $M_x(CO_3)_y$; c) mixing the iron oxide fine and the metal carbonate to form a mixture; d) calcining the mixture of the iron oxide fine and the metal carbonate; wherein M is a divalent metal ion. In some aspects, no crushing step is required for the iron oxide fine. In other aspects, no preheating step is required for the iron oxide fine.

In one aspect, the method comprises at least one calcining step. In a further aspect, the mixture is calcined at a temperature of at least about 1000° C. In a still further aspect, the hard magnetic material can be fired at a temperature in a range derived from any two of the above listed exemplary values. For example, in one aspect, the temperature of the firing step is maintained at a temperature between about 1100° C. and about 1300° C. In a further aspect, the calcining temperature can be between about 1150° C. and about 1200° C., although higher temperatures can be used provided that the residence time in the processing equipment is adjusted.

In one aspect, the mixture is calcined for a duration of at least about 4 hours, including exemplary values of 5, 6, 7, 8, 9, 10, 11, and 12 hours. In a further aspect, the hard magnetic material can be calcined for a duration in a range derived from any two of the above listed exemplary values. For example, in one aspect, the duration of the calcining step is between about 4 and about 12 hours. For example, it can be desirable to maintain the calcining temperature between about 1000° C. and about 1100° C., although higher temperatures can be used provided that the residence time in the processing equipment is adjusted.

In one aspect, the method comprises at least one firing step. In a further aspect, the firing step comprises heating at a heating rate of 10° C. $min^{-1}$ in air atmosphere. In a yet further aspect, the mixture is fired at a temperature of at least about 1000° C. In a still further aspect, the hard magnetic material can be fired at a temperature in a range derived from any two of the above listed exemplary values. For example, in one aspect, the temperature of the firing step is maintained at a temperature between about 1000° C. and about 1300° C.

In a further aspect, the firing temperature can be between about 1100° C. and about 1200° C., although higher temperatures can be used provided that the residence time in the processing equipment is adjusted.

In one aspect, the mixture is fired for a duration of at least about 2 hours, including exemplary values of 3, 4, 5, and 6 hours. In a further aspect, the hard magnetic material can be fired for a duration in a range derived from any two of the above listed exemplary values. For example, in one aspect, the duration of the firing step is between about 3 and about 5 hours.

In one aspect, the hard magnetic material is hexagonal ferrites; M is strontium; and $Fe_xO_y$ is $Fe_{12}O_{19}$. In a further aspect, the metal oxide is SrO and iron oxide is $Fe_2O_3$, are provided in a Sr/Fe mixture ratio of about 1:12, the mixture calcined at 1000° C. for about 12 hours, and the mixture is fired at 1200° C. for about 4 hours.

In another aspect, the hard magnetic material is hexagonal ferrites; M is strontium; and $Fe_xO_y$ is $Fe_{12}O_{19}$. In a further aspect, the metal carbonate is $SrCO_3$ and iron oxide is $Fe_2O_3$, are provided in a Sr/Fe mixture ratio of about 1:12, the mixture calcined at 1000° C. for about 12 hours, and the mixture is fired at 1200° C. for about 4 hours.

D. ARTICLES OF MANUFACTURE

In various aspects, the disclosed hard magnetic material of the present invention can be used in making articles formed from ferrite powder. The disclosed hard magnetic material can be formed into useful shaped articles by a variety of means such as sintering, and the like.

In various aspects, articles of the present invention are selected from electronic and non-electronic applications, including, but not limited to industrial and consumer electronics, data storage, military and aerospace, medical, power generation, and telecommunications. In one aspect, the present invention pertains to permanent magnets, recording media, telecommunication devices, medical devices, microwave devices, higher-frequency devices, and magneto-optical devices comprising the disclosed hard magnetic material. In a further aspect, the disclosed hard magnetic material is used as a dielectric or magnetic filler in electromagnetic attenuation materials (EAM).

Optionally, in various aspects, the disclosed methods can be operated or performed on an industrial scale. In one aspect, the methods disclosed herein can be configured to produce hard magnetic material on an industrial scale. For example, according to further aspects, the methods can produce batches of hard magnetic material on an industrial scale. In a further aspect, the batch size can comprise any desired industrial-scale batch size.

In one aspect, the batch size can optionally be at least about 1 kg, including exemplary batch sizes of at least about 10 kg, at least about 25 kg, at least about 50 kg, at least about 100 kg, at least about 250 kg, at least about 500 kg, at least about 750 kg, at least about 1,000 kg, at least about 2,500 kg, or greater. In an additional aspect, the batch size can optionally range from about 1 kg to about 2,500 kg, such as, for example, from about 10 kg to about 1,000 kg, from about 1,000 kg to about 2,500 kg, from about 100 kg to about 500 kg, from about 500 kg to about 1,000 kg, from about 10 kg to about 100 kg, from about 100 kg to about 250 kg, from about 500 kg to about 750 kg, or from about 750 kg to about 1,000 kg.

In another aspect, the batch size can optionally be at least about 1 ton, including exemplary batch sizes of at least about 10 tons, at least about 25 tons, at least about 50 tons, at least about 100 tons, at least about 250 tons, at least about 500 tons, at least about 750 tons, at least about 1000 tons, at least about 2,500 tons, or greater. In an additional aspect, the batch size can optionally range from about 1 ton to about 2,500 tons, such as, for example, from about 10 tons to about 1,000 tons, from about 1,000 tons to about 2,500 tons, from about 100 tons to about 500 tons, from about 500 tons to about 1,000 tons, from about 10 tons to about 100 tons, from about 100 tons to about 250 tons, from about 500 tons to about 750 tons, or from about 750 tons to about 1,000 tons.

In various aspects, the disclosed methods can be operated or performed on any desired time scale or production schedule that is commercially practicable. In one aspect, the disclosed methods can produce a quantity of at least 1 ton of hard magnetic material in a period of 1 day or less, including exemplary quantities of at least about 10 tons, 100 tons, 500 tons, or 1,000 tons, 2,500 tons, or greater within the period. In a further aspect, the period of time can be 1 hour. In a still further aspect, the quantity of hard magnetic material produced can range from about 1 ton to about 1,000 tons, and the period of time can range from about 1 hour to about 1 year, for example, about 10 to about 1,000 tons in a period of about 1 hour to about 1 day.

E. ASPECTS

In various aspects, the present invention pertains to and includes at least the following aspects.

Aspect 1: A method for making a hard magnetic material of a general formula $MFe_xO_y$, the method comprising: a) providing an iron oxide fine; b) providing a metal carbonate of a general formula $Me_x(CO_3)_y$; c) mixing the iron oxide fine and the metal carbonate to form a mixture; and d) calcining the mixture of the iron oxide fine and the metal carbonate; wherein M is a divalent metal ion.

Aspect 2: The method of aspect 1, wherein the iron oxide fine is provided as a by-product of an iron processing or iron making process.

Aspect 3: The method of aspects 1 or 2, wherein the iron oxide fine comprises at least about 93 wt % $Fe_2O_3$.

Aspect 4: The method of aspects 1-3, wherein M is strontium.

Aspect 5: The method of aspects 1-4, wherein the metal carbonate is $SrCO_3$.

Aspect 6: The method of aspects 1-5, wherein the mixture is calcined at a temperature of at least about 1000° C.

Aspect 7: The method of aspects 1-6, wherein the mixture is calcined for about 4 to 12 hours.

Aspect 8: The method of aspects 1-7, wherein M is strontium; and $Fe_xO_y$ is $Fe_{12}O_{19}$.

Aspect 9: The method of aspects 1-8, wherein the hard magnetic material is a hard ferrite.

Aspect 10: The method of aspect 9, wherein the hard ferrite is a hexagonal ferrite.

Aspect 11: The method of aspects 1-10, wherein the hard magnetic material is hexagonal ferrites; M is strontium; and $Fe_xO_y$ is $Fe_{12}O_{19}$.

Aspect 12: The method of aspects 1-11, wherein the hard magnetic material comprises from greater than 0 to about 15 wt % SrO and from greater than 85 to about 95 wt % $Fe_2O_3$.

Aspect 13: The method of aspects 1-12, wherein the hard magnetic material comprises from greater than 0 to about 10 wt % SrO and from greater than 83 to about 90 wt % $Fe_2O_3$.

Aspect 14: The method of aspects 1-13, wherein the metal oxide is provided in at least a stoichiometric amount relative to an amount of the iron oxide fine.

Aspect 15: The method of aspects 1-14, wherein the hard magnetic material has an intrinsic coercivity ($_iH_c$) of at least 100 kA/m.

Aspect 16: The method of aspects 1-15, wherein the hard magnetic material has an intrinsic coercivity ($_iH_c$) in the range of from 100 to 550 kA/m.

Aspect 17: The method of aspects 1-16, wherein the hard magnetic material has a saturation magnetization (Ms) of at least about 50 Am$^2$/kg.

Aspect 18: The method of aspects 1-17, wherein the hard magnetic material has a saturation magnetization (Ms) in the range of about 50 to 100 Am$^2$/kg.

Aspect 19: The method of aspects 1-18, wherein no crushing step is required for the iron oxide fine.

Aspect 20: The method of aspects 1-19, wherein no preheating step is required for the iron oxide fine.

Aspect 21: A method for making a hard magnetic material of a general formula MFe$_x$O$_y$, the method comprising: a) providing an iron oxide fine; b) providing a metal carbonate comprising SrCO$_3$; c) mixing the iron oxide fine and the metal carbonate to form a mixture; and d) calcining the mixture of the iron oxide fine and the metal carbonate.

Aspect 22: The method of claim 1 or 21, wherein the metal carbonate and iron oxide are provided at a stoichiometric ratio.

Aspect 23: The method of aspect 1 or 21, wherein the metal carbonate and iron oxide are provided at a metal carbonate/iron oxide ratio of at least about 1:10.

Aspect 24: The method of aspect 1 or 21, wherein the metal carbonate and iron oxide are provided at a metal carbonate/iron oxide ratio of at least about 1:12.

Aspect 25: The method of aspect 21, wherein the strontium carbonate and iron oxide are provided at a stoichiometric ratio.

Aspect 26: The method of aspect 21, wherein the strontium carbonate and iron oxide are provided at a Sr/Fe ratio of at least about 1:10.

Aspect 27: The method of aspect 21, wherein the strontium carbonate and iron oxide are provided at a Sr/Fe ratio of at least about 1:12.

Aspect 28: The method of aspect 1 or 21, wherein the hard magnetic material has energy product value (BH) at 300 K of at least about 2.0 MGOe.

Aspect 29: The method of aspect 1 or 21, wherein the hard magnetic material has energy product value (BH) at 300 K of at least about 2.3 MGOe.

Aspect 30: The method of aspect 1 or 21, wherein the hard magnetic material has energy product value (BH) at 4.2 K of at least about 2.0 MGOe.

Aspect 31: The method of aspect 1 or 21, wherein the hard magnetic material has energy product value (BH) at 4.2 K of at least about 2.3 MGOe.

Aspect 32: The method of aspect 1 or 21, wherein the mixture is calcined at a temperature of at least about 1000° C. for a period from about 4 hour to about 12 hours.

Aspect 33: The method of aspect 1 or 21, wherein the mixture is fired at a temperature of a of at least about 1000° C.

Aspect 34: The method of aspect 1 or 21, wherein the mixture is fired at a temperature of a about 1000° C. to about 1200° C.

Aspect 35: The method of aspect 1 or 21, wherein the mixture is fired for a period of at least about 2 hours.

Aspect 36: The method of aspect 1 or 21, wherein the mixture is fired for a period of about 2 hours to about 4 hours.

Aspect 37: The method of aspect 1 or 21, wherein the mixture is fired at a temperature of a about 1000° C. to about 1200° C. for period of from about 2 to about 4 hours.

Aspect 38: The method of aspect 1 or 21, wherein the metal carbonate and iron oxide are provided at a metal carbonate/iron oxide ratio of about 1:12, the mixture is calcined at about 1000° C. for about 12 hours, and the mixture is fired at about 1200° C. for about 4 hours.

Aspect 39: The method of aspect 21, wherein the strontium carbonate and iron oxide are provided at a Sr/Fe ratio of about 1:12, the mixture is calcined at about 1000° C. for about 12 hours, and the mixture is fired at about 1200° C. for about 4 hours.

Aspect 40: A method for making a hard magnetic material of a general formula MFe$_x$O$_y$, the method comprising: a) providing an iron oxide fine; b) providing a metal oxide of a general formula Me$_x$O$_y$; c) mixing the iron oxide fine and the metal oxide to form a mixture; and d) calcining the mixture of the iron oxide fine and the metal oxide; wherein M is a divalent metal ion.

Aspect 41: The method of aspect 40, wherein the iron oxide fine is provided as a by-product of an iron processing or iron making process.

Aspect 42: The method of aspects 40-41, wherein the iron oxide fine comprises at least about 93 wt % Fe$_2$O$_3$.

Aspect 43: The method of aspects 40-42, wherein the metal oxide is provided as a carbonate salt.

Aspect 44: The method of aspects 40-43, wherein the metal oxide is SrCO$_3$.

Aspect 45: The method of aspects 40-44, wherein the mixture is calcined at a temperature of at least about 1000° C.

Aspect 46: The method of aspects 40-45, wherein the mixture is calcined for about 4 to 12 hours.

Aspect 47: The method of aspects 40-46, wherein M is strontium; and Fe$_x$O$_y$ is Fe$_{12}$O$_{19}$.

Aspect 48: The method of aspects 40-47, wherein the hard magnetic material is a hard ferrite.

Aspect 49: The method of aspect 48, wherein the hard ferrite is a hexagonal ferrite.

Aspect 50: The method of aspects 40-49, wherein the hard magnetic material is hexagonal ferrites; M is strontium; and Fe$_x$O$_y$ is Fe$_{12}$O$_{19}$.

Aspect 51: The method of aspects 40-50, wherein the hard magnetic material comprises from greater than 0 to about 15 wt % SrO and from greater than 85 to about 95 wt % Fe$_2$O$_3$.

Aspect 52: The method of aspects 40-51, wherein the hard magnetic material comprises from greater than 0 to about 10 wt % SrO and from greater than 83 to about 90 wt % Fe$_2$O$_3$.

Aspect 53: The method of aspects 40-52, wherein the metal oxide is provided in at least a stoichiometric amount relative to an amount of the iron oxide fine.

Aspect 54: The method of aspects 40-53, wherein the hard magnetic material has an intrinsic coercivity (A) of at least 100 kA/m.

Aspect 55: The method of aspects 40-54, wherein the hard magnetic material has an intrinsic coercivity (A) in the range of from 100 to 550 kA/m.

Aspect 56: The method of aspects 40-55, wherein the hard magnetic material has a saturation magnetization (Ms) of at least about 50 Am$^2$/kg.

Aspect 57: The method of aspects 40-56, wherein the hard magnetic material has a saturation magnetization (Ms) in the range of about 50 to 100 Am$^2$/kg.

Aspect 58: The method of aspects 40-57, wherein no crushing step is required for the iron oxide fine.

Aspect 59: The method of aspects 40-58, wherein no preheating step is required for the iron oxide fine.

Aspect 60: A method for making a hard magnetic material of a general formula $MFe_xO_y$, the method comprising: a) providing an iron oxide fine; b) providing a metal carbonate salt of a general formula $M_x(CO_3)_y$; c) mixing the iron oxide fine and the metal carbonate to form a mixture; and d) calcining the mixture of the iron oxide fine and the metal carbonate; wherein M is strontium.

Without further elaboration, it is believed that one skilled in the art can, using the description herein, utilize the present invention. The following examples are included to provide addition guidance to those skilled in the art of practicing the claimed invention. The examples provided are merely representative of the work and contribute to the teaching of the present invention. Accordingly, these examples are not intended to limit the invention in any manner.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein can be different from the actual publication dates, which can require independent confirmation.

F. EXAMPLES

The following examples are put forth so as to provide those of ordinary skill in the art with a complete disclosure and description of how the compounds, compositions, articles, devices and/or methods claimed herein can be made and can be evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or can be at ambient temperature, and pressure can be at or near atmospheric. Unless indicated otherwise, percentages referring to composition are in terms of wt %.

There are numerous variations and combinations of reaction conditions, e.g., component concentrations, desired solvents, solvent mixtures, temperatures, pressures and other reaction ranges and conditions that can be used to optimize the product purity and yield obtained from the described process. Only routine experimentation, if any, will be required to optimize such process conditions. Several methods for preparing the compounds of this invention are illustrated in the following examples.

Example 1

In one aspect, Tables 1 and 2 below show the typical analysis of iron ore materials or oxide fines that can be used to produce the disclosed hard magnetic material. In further aspects, other ingredients can include various amounts of carbon, sulfur, sodium, potassium, and/or calcium.

TABLE 1*

| Element | Material |
| --- | --- |
| C | 0.2959 |
| Na2O | 0.041 |
| MgO | 0.859 |
| Al2O3 | 0.788 |
| SiO2 | 2.704 |
| P2O5 | 0.057 |
| S | 0.0254 |
| Cl | 0.0055 |
| K2O | 0.0339 |
| CaO | 2.366 |
| TiO2 | 0.114 |
| V2O5 | 0.0794 |
| Cr2O3 | 0.00177 |
| MnO | 0.0763 |
| Fe2O3 | Balance |
| Total | 100.0 |

*Amounts provided in terms of percent of total composition (by weight).

TABLE 2*

| Element | Material |
| --- | --- |
| C | 0.2959 |
| O | 30.78 |
| Na2O | 0.03 |
| MgO | 0.518 |
| Al2O3 | 0.417 |
| SiO2 | 1.264 |
| P2O5 | 0.025 |
| S | 0.0254 |
| Cl | 0.0055 |
| K2O | 0.0281 |
| CaO | 1.691 |
| TiO2 | 0.0684 |
| V2O5 | 0.0445 |
| Cr2O3 | 0.00121 |
| MnO | 0.0591 |
| Fe2O3 | Balance |
| Total | 100.0 |

*Amounts provided in terms of percent of total composition (by weight).

Example 2

In a general aspect, hard magnetic material were prepared by in a dry-blend and mixed for a predetermined duration. The pre-blend was then dry-milled for a predetermined duration. The blended powder mixture was then calcined at about 1000° C. for 4 to 12 hours, and then re-milled in a dry atmosphere. Next, the calcined, milled mixture was fired at about 1100 to 1300° C. for about 2 to 6 hours with a heating rate of 10 C min$^{-1}$ in air atmosphere. Following firing, the cooled mixture was characterized with X-ray diffraction analysis (XRD), X-ray fluorescence (XRF), scanning electron microscope (SEM) and vibrating sample magnetometer (VSM).

Figure 1B:
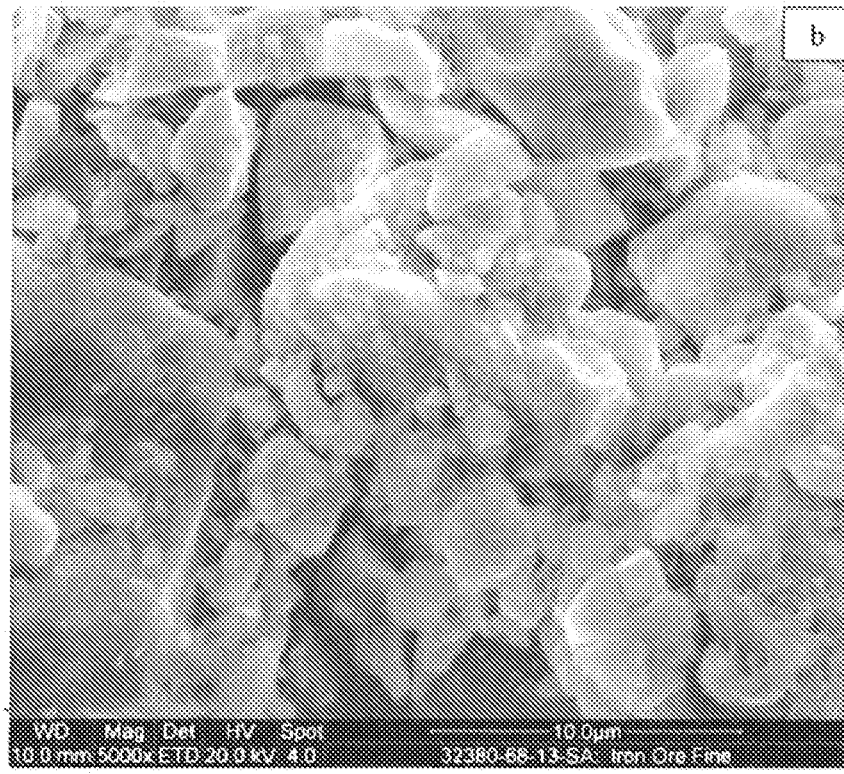

In this Example, strontium carbonate ($SrCO_3$) (99% purity, Chemical) and steelmaking by-product iron oxide were used to prepare hard magnetic material ($SrFe_{12}O_{19}$) according to the present invention. The iron oxide samples were characterized using X-ray diffraction analysis (XRD), X-ray fluorescence (XRF) and scanning electron microscope (SEM). The iron oxide ($Fe_2O_3$) was found to have a purity of about 93%. For SEM analysis, the sample to be examined was fixed directly on adhesive tape and then examined under scanning microscope. FIGS. 1A and 1B show the SEM photos for the iron oxide used to produce the samples in this Example. As seen in the FIGS., the grain coalescence with very low micropores and many macropores took place in a dense structure.

The M-type strontium ferrites were prepared using a conventional ceramic preparation method. Briefly, all constituents ($SrCO_3$ and iron oxide fine byproduct, at different Sr/Fe ratios of 1/12, 1/11 and 1/10) were pre-blended and mixed together. The mixture was first dry-milled for 6 hours, and then pre-sintered (calcination) at 1000° C. for a duration of 4, 8 or 12 hrs. The mixture was allowed to cool to room temperature, and then re-milled in a dry atmosphere for 1 hr. The re-milled mixture was then fired at 1100, 1200 or 1300° C. for a duration of 2, 4 or 6 hrs. in air atmosphere, and allowed to cool to room temperature. The produced powder was then characterized using X-ray diffraction analysis (XRD), X-ray fluorescence (XRF), and scanning electron microscope (SEM). The magnetic properties, including Coercivity (He), Magnetic saturation (Ms), and Magnetic remanance (Mr), were also measured using vibrating sample magnetometer (VSM) with applied magnetic field 15 KOe at 300 & 4.2 K.

Figure 2:
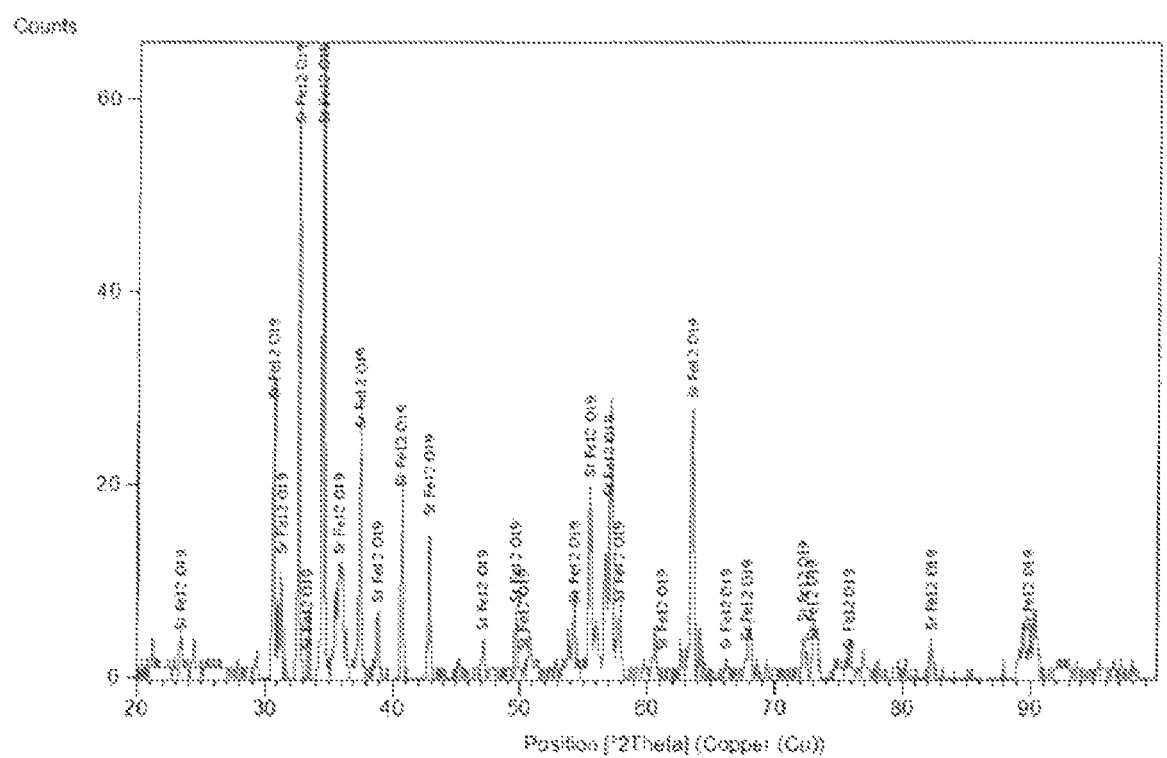
FIG. 2 shows a graph illustrating XRD data for iron oxide/strontium oxide mixture prepared according to the present invention.
Figure 3A:
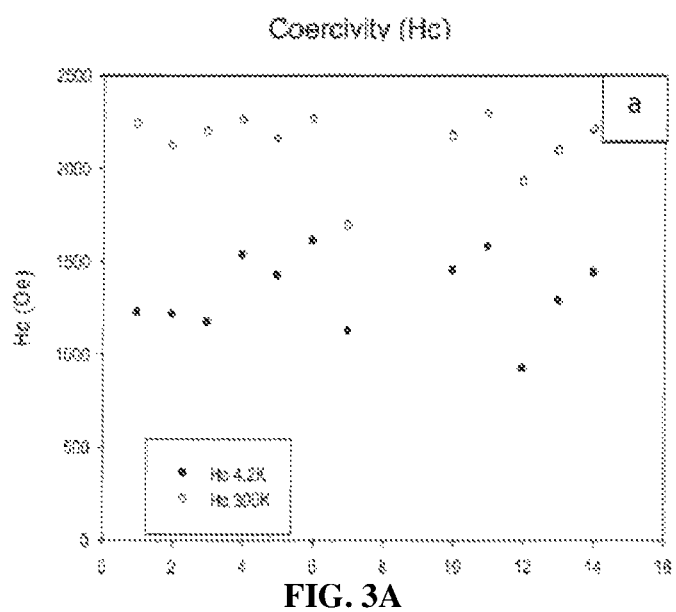
FIGS. 3A, 3B, and 3C show graphs illustrating magnetic properties of exemplary hard magnetic materials of the present invention.
Figure 3B:
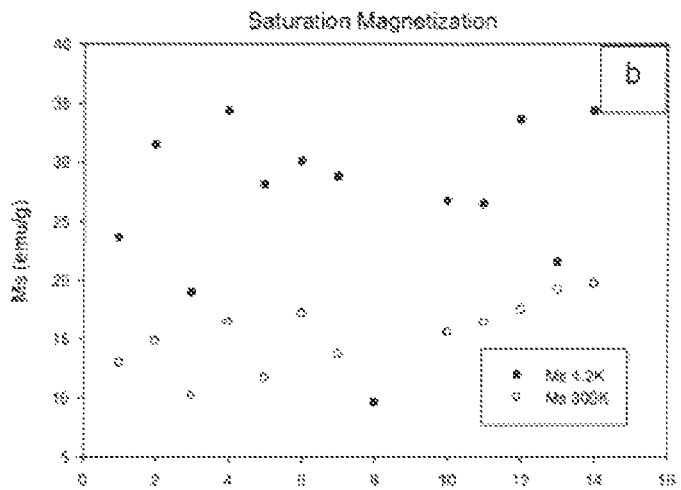
Figure 3C:
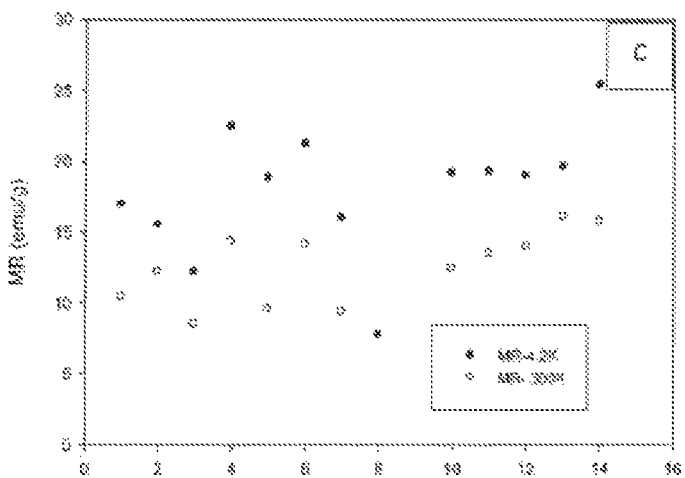

The XRD data for fired samples after calcination at 1000° C. for 12 hrs, and then firing at 1100° C. for 2 hrs, are shown in FIG. 2. As the data show, strontium carbonate decomposed to SrO and the strontium ferrite phase is completely formed. The magnetic property data for Coercivity (He), Magnetic saturation (Ms), and Magnetic remanance (Mr) of the samples are shown in FIGS. 3A, 3B, and 3C, respectively. As the data show, the measured magnetic values were all measured to be in a narrow range, irrespective of the different reaction and preparation conditions utilized for each sample. Furthermore, the measured magnetic values at 300 and 4.2 K are very close to each other, which also indicates excellent magnetic behavior.

The value of the energy product (BH), which is representative of the energy required to demagnetize a permanent magnet, was calculated comparatively for the different samples. The influence of parameters such as Sr/Fe stoichiometric ratios, calcination time, firing time and firing temperature on phase formation, microstructure and magnetic properties of the prepared samples were also investigated.

Figure 4:
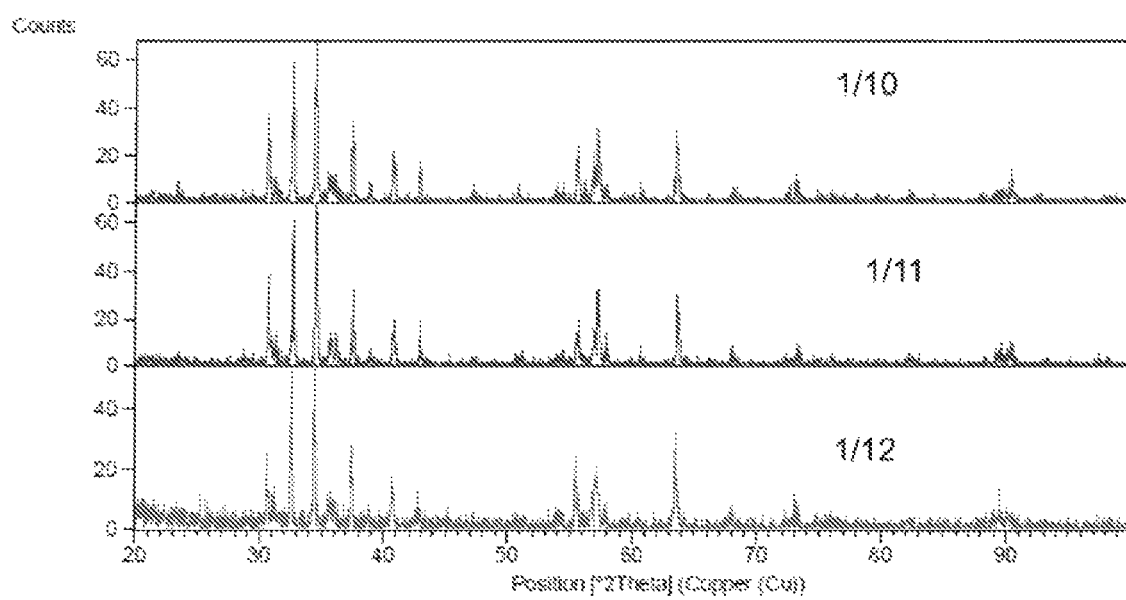
FIG. 4 shows a graph illustrating XRD data for exemplary hard magnetic materials of the present invention.
Figure 5:
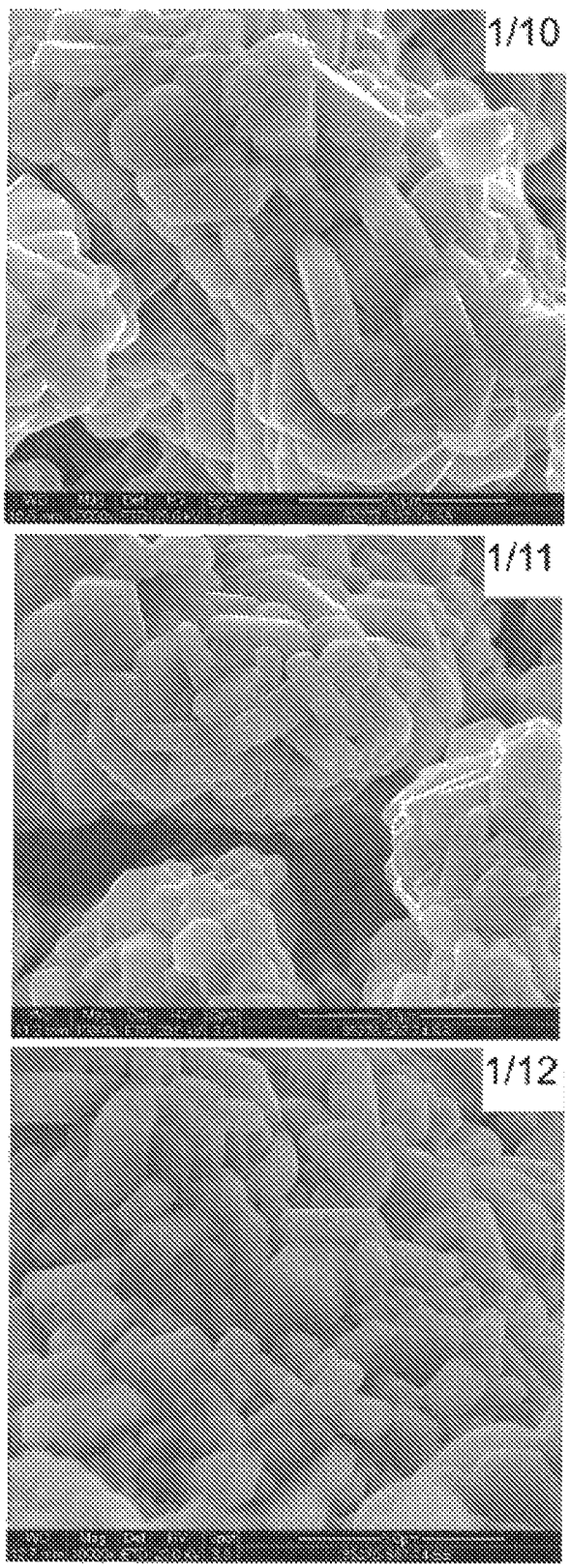
FIG. 5 shows SEM micrographs of exemplary hard magnetic materials of the present invention.
Figure 6A:
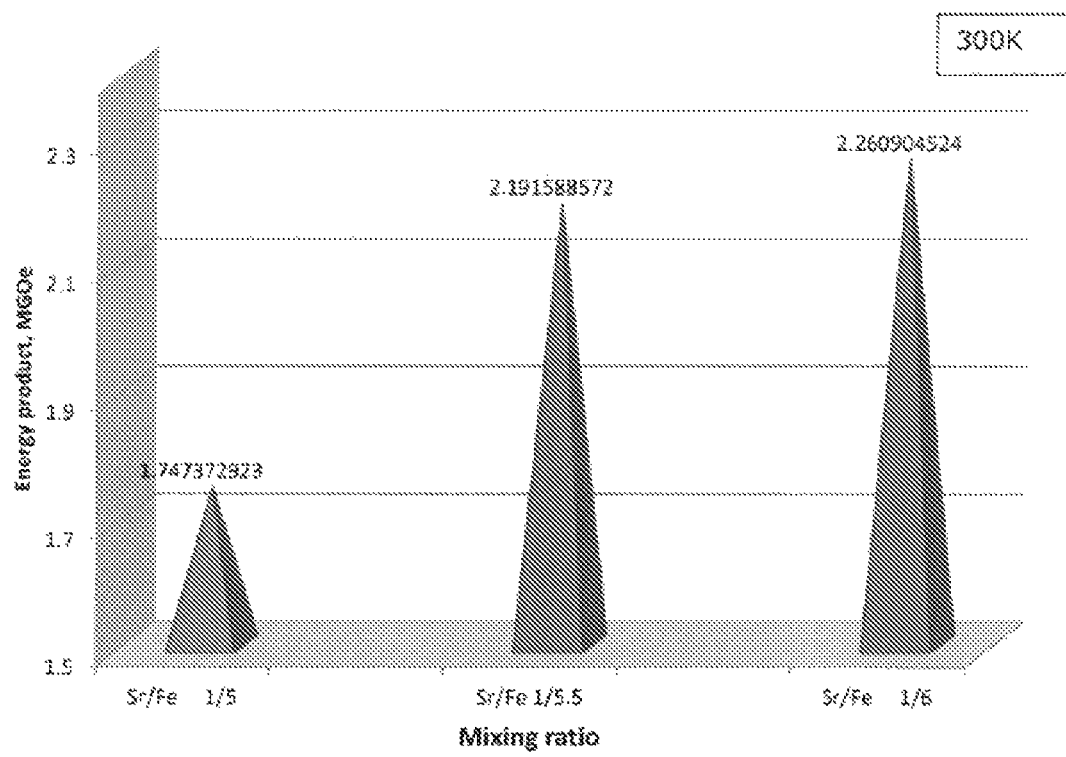
FIGS. 6A and 6B show graphs illustrating energy product values (BH) for exemplary hard magnetic materials of the present invention.
Figure 6B:
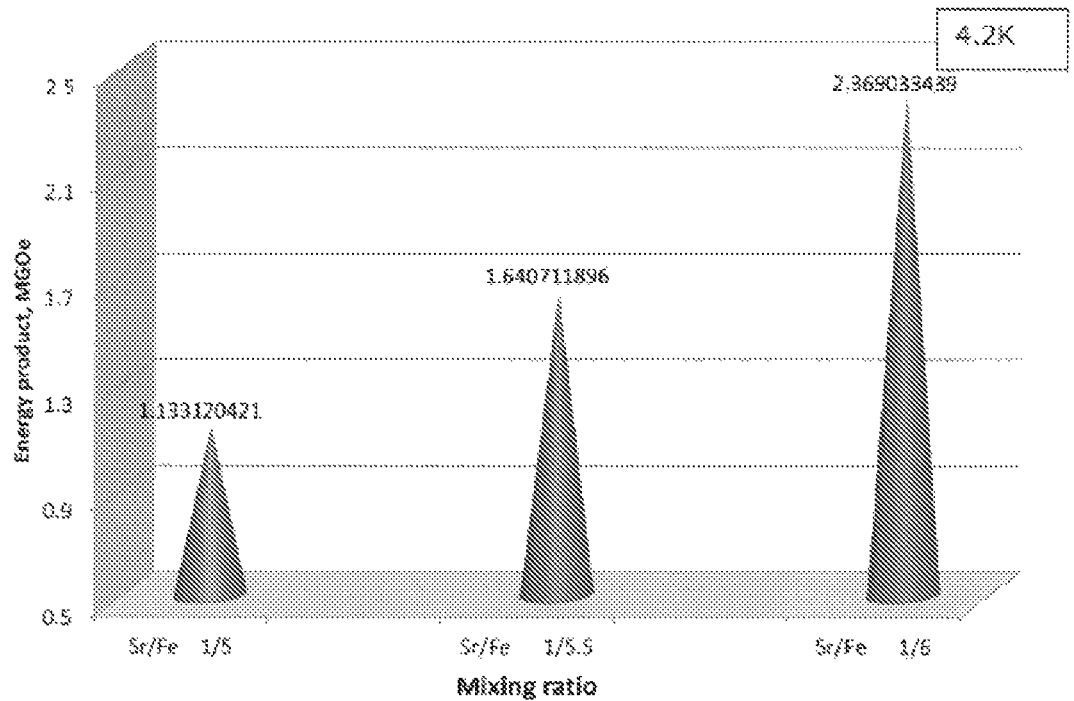

Three samples were prepared using strontium carbonate and iron oxide at Sr/Fe ratios of 1/12, 1/11 or 1/10, calcination at 1000° C. for 12 hrs, and firing at 1200° C. for 4 hrs. The XRD data for the three samples are shown in FIG. 4. As the data show, the Sr-ferrite phase is successfully formed completely in all three samples. Moreover, there are no peaks for unreacted $Fe_2O_3$ or SrO. As shown in FIG. 5, the grain size (1-3μ) and grain shape of the synthesized strontium ferrite was observed to be very similar, with uniform and homogeneous hexagonal crystalline shape. As shown in FIGS. 6A and 6B, the energy product was observed to increase when the Sr/Fe ratios were increased from 1/10 to 1/12 either at 300 or 4.2 K.

Figure 7:
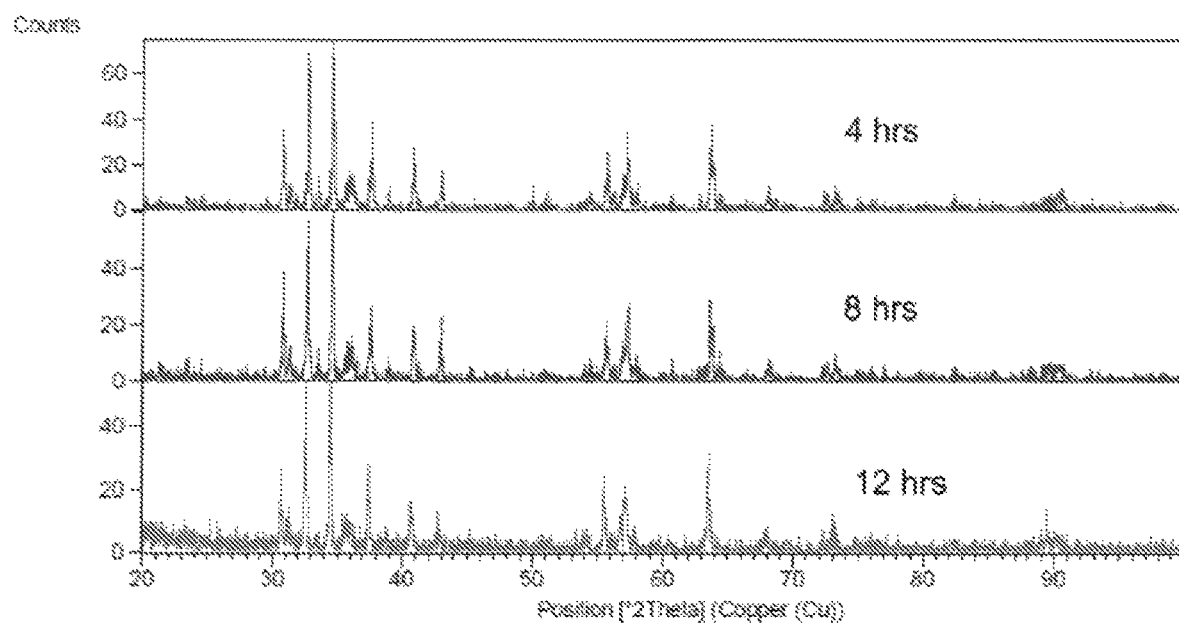
FIG. 7 shows a graph illustrating XRD data for exemplary hard magnetic materials of the present invention.
Figure 8:
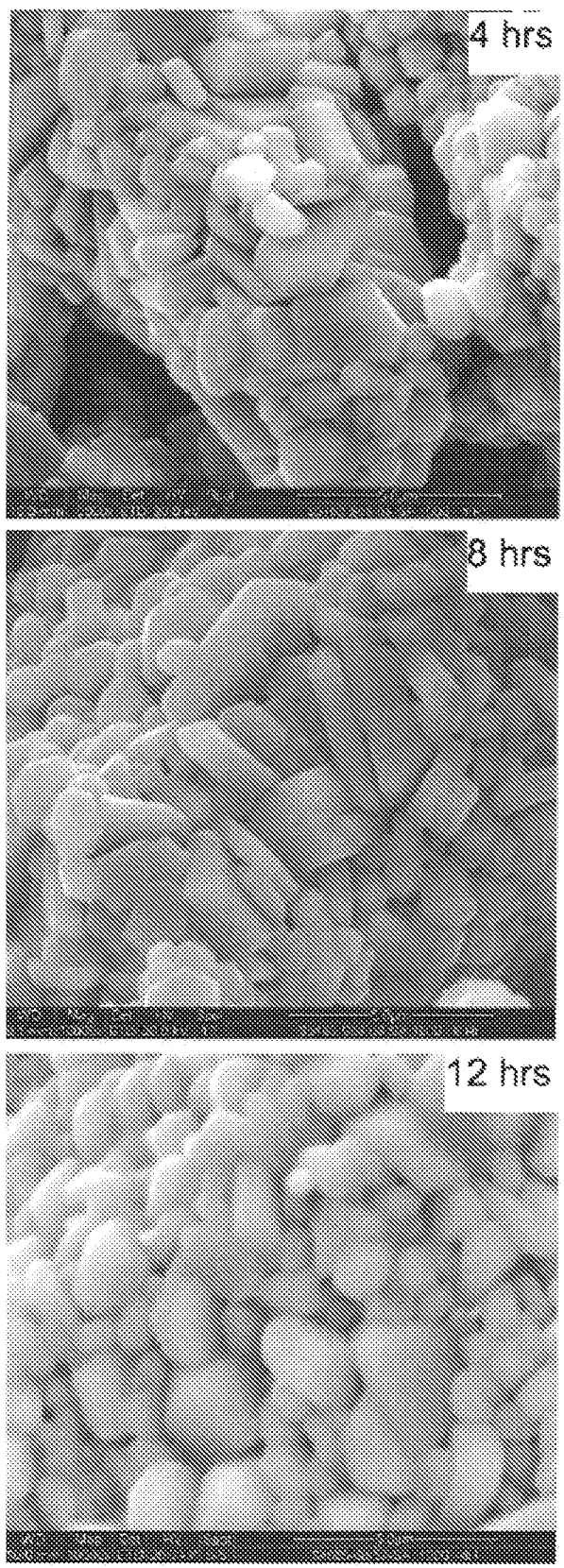
FIG. 8 shows SEM micrographs of exemplary hard magnetic materials of the present invention.
Figure 9A:
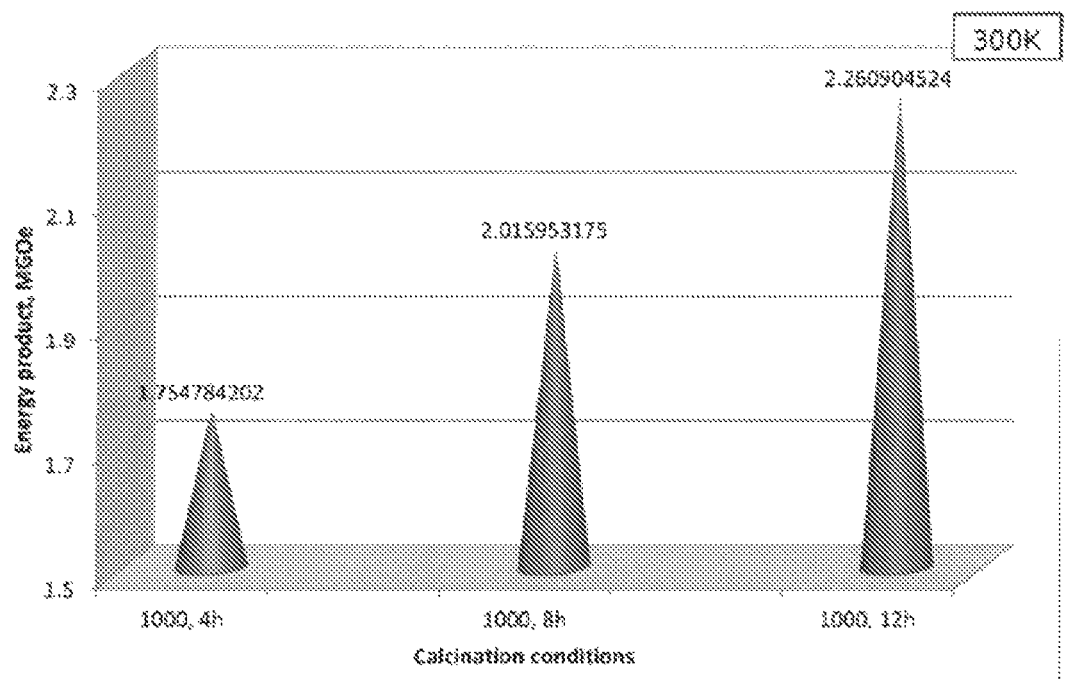
FIGS. 9A and 9B show graphs illustrating energy product values (BH) for exemplary hard magnetic materials of the present invention.
Figure 9B:
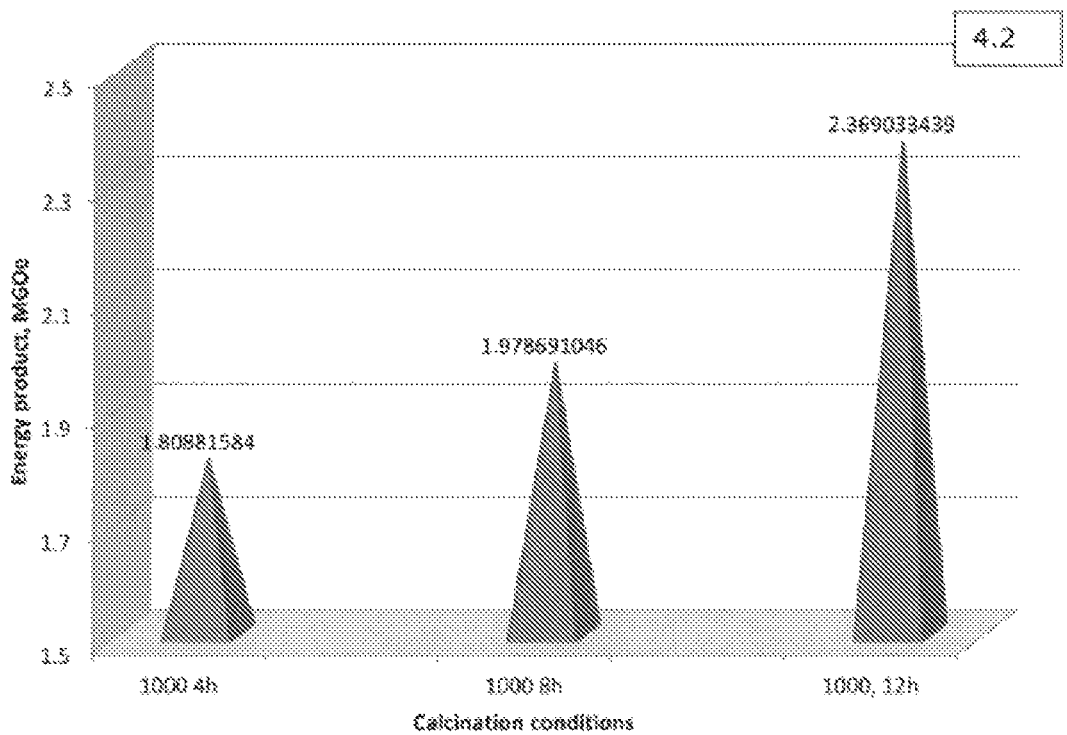

Next, three samples were prepared using strontium carbonate and iron oxide in a 1/12 Sr/Fe ratio and then calcined at 1000° C. for 4, 8 or 12 hrs and then fired at 1200° C. for 4 hrs. The XRD data for the samples are reported in FIG. 7. As the data show, the Sr-ferrite phase is successfully formed completely in the three samples. As shown in FIG. 8, the grain size (1-3μ) and grain shape of the synthesized strontium ferrite was observed to be very similar with uniform and homogeneous hexagonal crystalline shape. The energy product was observed to increase with increasing the calcination time from 4 to 12 hrs at 300 or 4.2 K as shown in FIGS. 9A and 9B.

Figure 10:
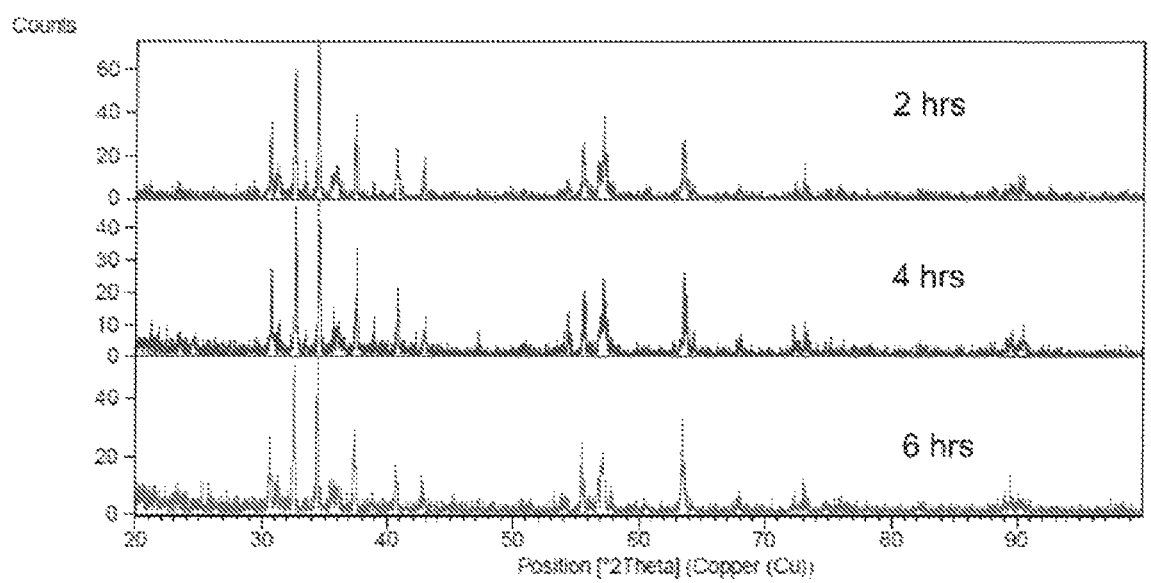
FIG. 10 shows a graph illustrating XRD data for exemplary hard magnetic materials of the present invention.
Figure 11:
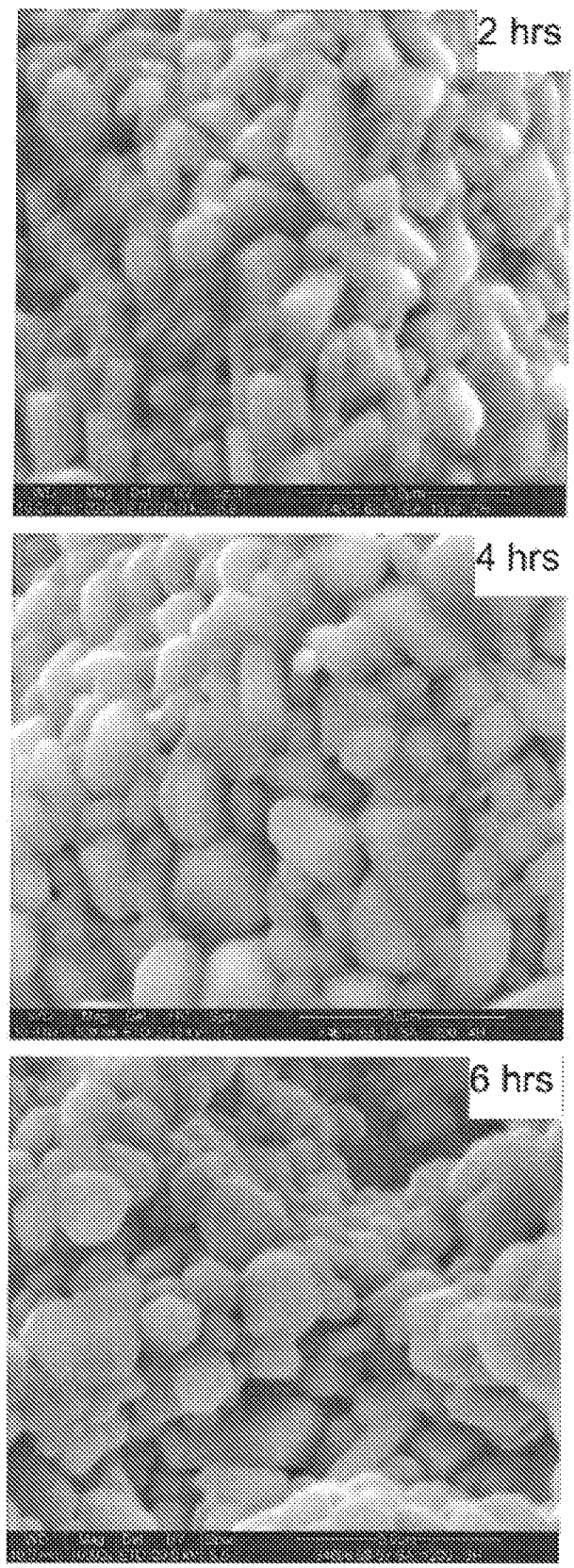
FIG. 11 shows SEM micrographs of exemplary hard magnetic materials of the present invention.
Figure 12:
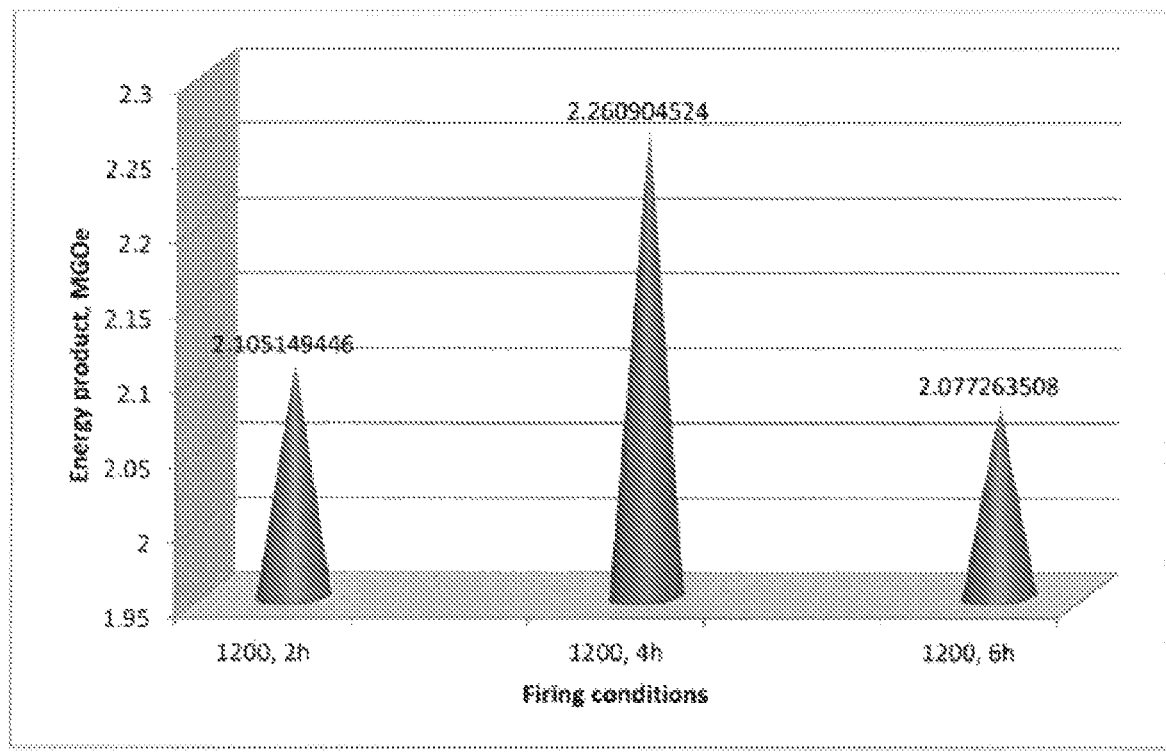
FIG. 12 shows a graph illustrating energy product values (BH) for exemplary hard magnetic materials of the present invention.

Next, samples were prepared using strontium carbonate and iron oxide in a 1/12 Sr/Fe ratio and then calcined at 1000° C. for 12 hrs, and then fired at 1200° C. for 2, 4, or 6 hrs. The XRD data for the samples are reported in FIG. 10. As the data show, for each of the samples fired at 1200° C., the Sr-ferrite phase was observed to have form completely in the various samples. Moreover, there were no observed peaks for unreacted $Fe_2O_3$ or SrO. The morphological examination for these samples are shown in FIG. 11. As the data suggests, there was no clear change in the grain size with increasing the firing time. Grain shape of the synthesized strontium ferrite came very similar with uniform and homogeneous hexagonal crystalline shape. The energy product was observed to increase with increasing the firing time up to 4 hrs but, decreased again with increasing the reaction time to 6 hrs as shown in FIG. 12. Without wishing to be bound by a particular theory, it is believed that this trend is due to the formation of multi-domain and the easy movement of the domain walls, which result in domain misalignment that decreases the energy product value.

Figure 13:
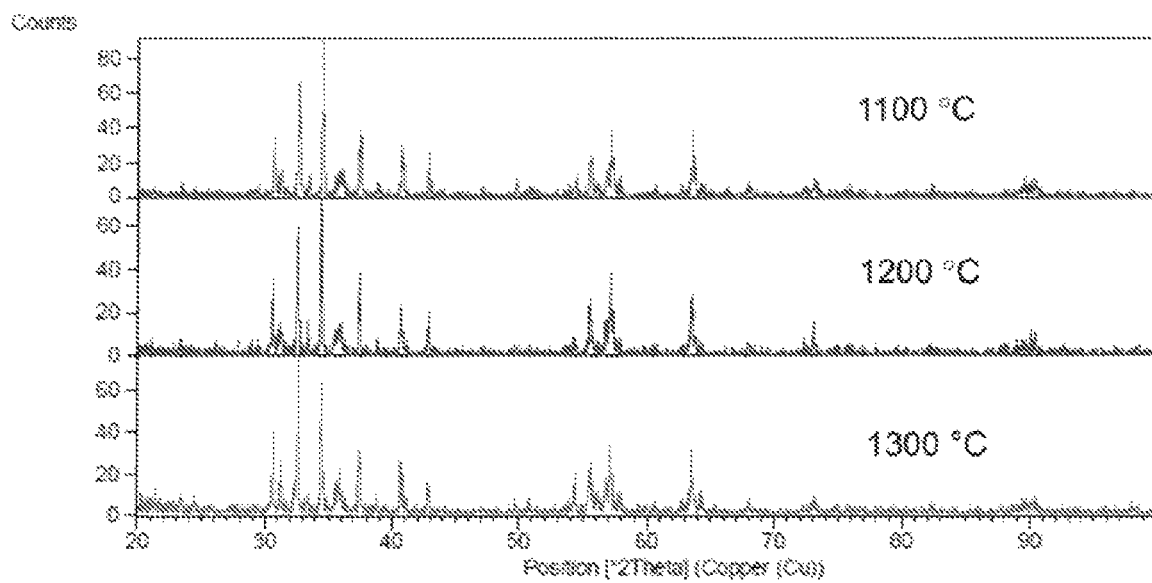
FIG. 13 shows a graph illustrating XRD data for exemplary hard magnetic materials of the present invention.
Figure 14:
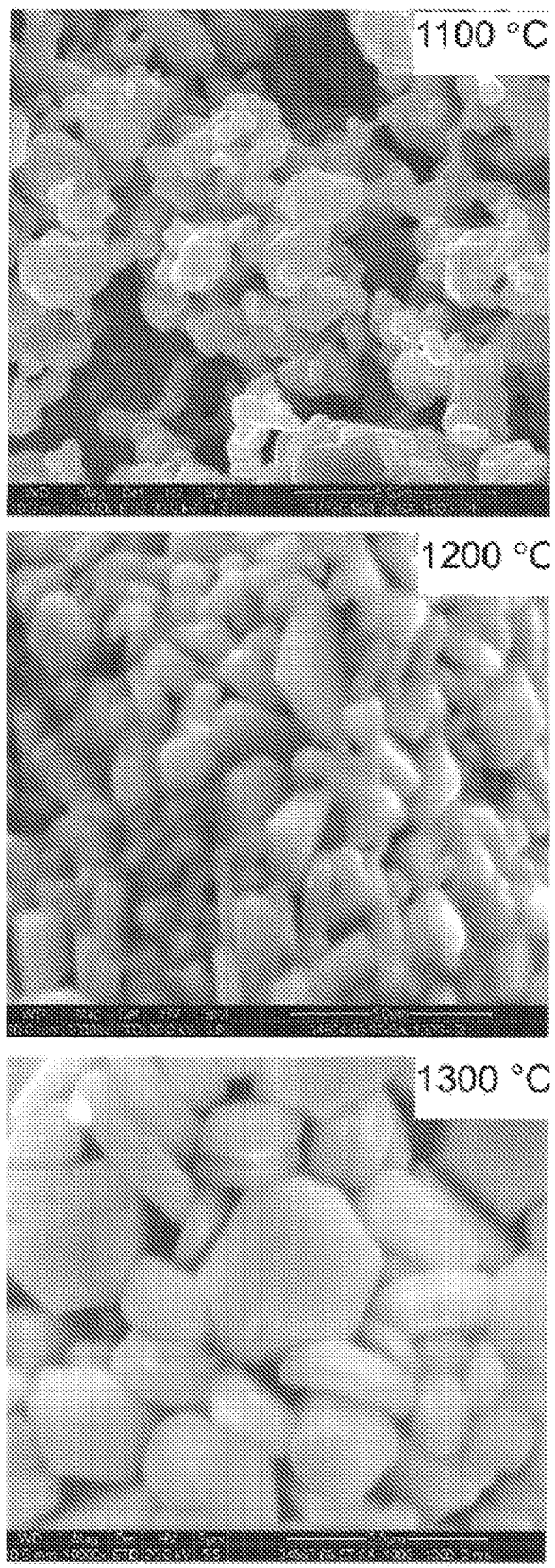
FIG. 14 shows SEM micrographs of exemplary hard magnetic materials of the present invention.
Figure 15A:
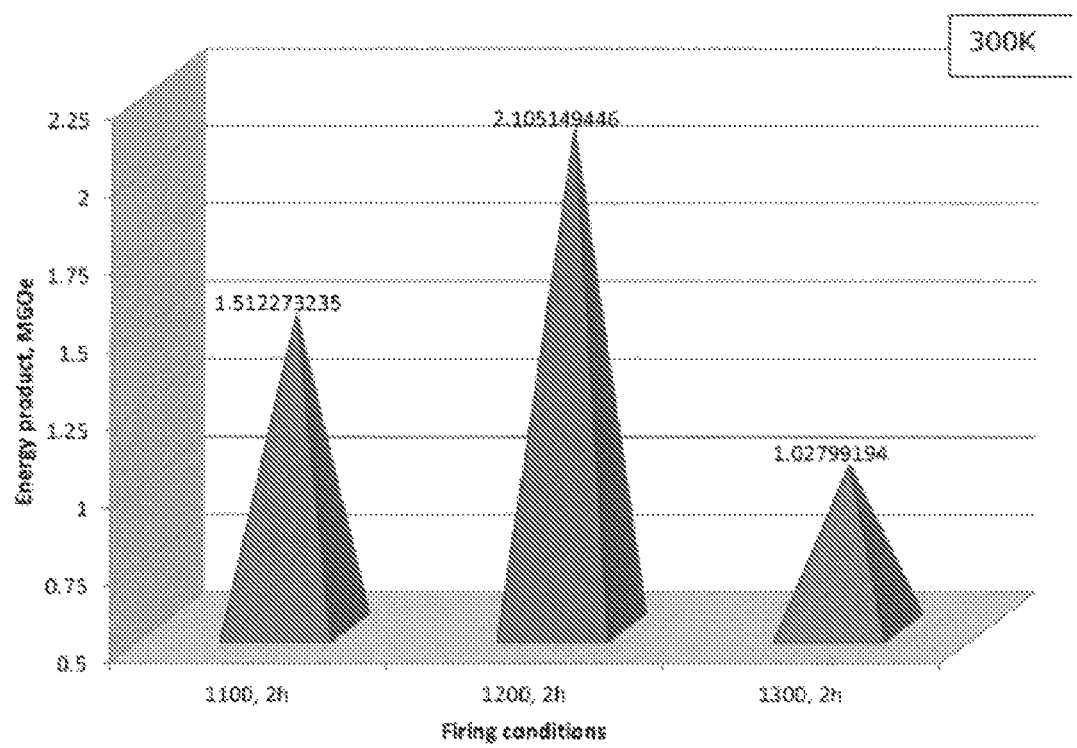
FIGS. 15A and 15B show graphs illustrating energy product values (BH) for exemplary hard magnetic materials of the present invention.
Figure 15B:
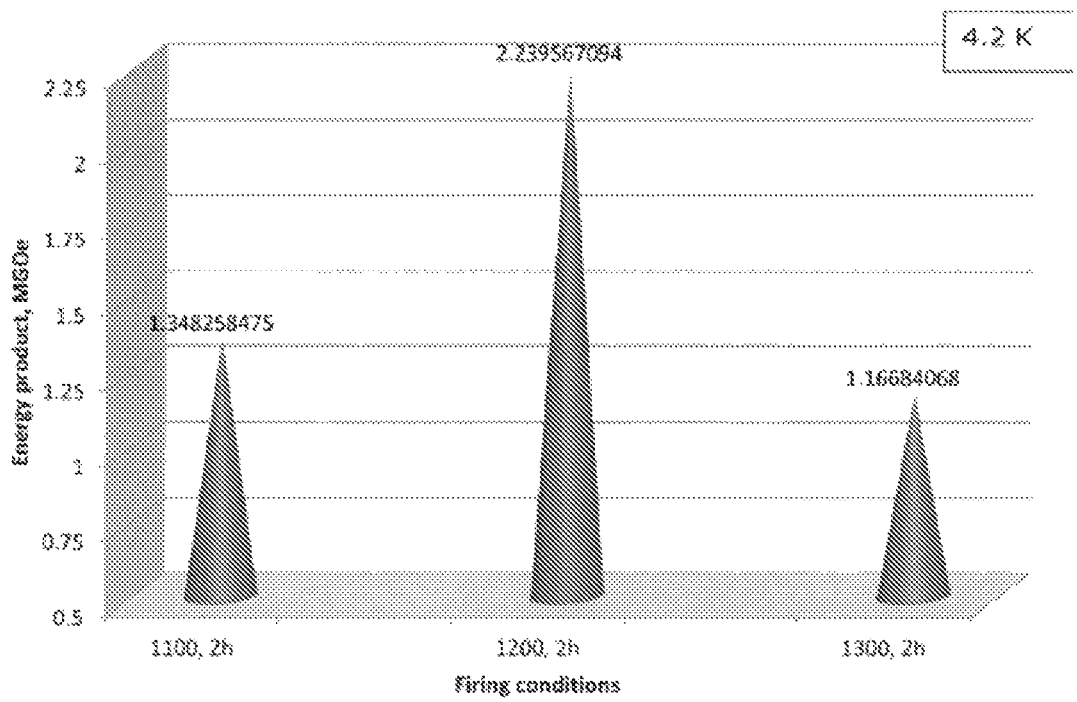

Next, samples were prepared using strontium carbonate and iron oxide in a 1/12 Sr/Fe ratio and then calcined at 1000° C. for 12 hrs, and then fired at 1100, 1200, or 1300° C. for 2 hrs. The XRD data for the samples are reported in FIG. 13. As the data show, for each of the samples fired at 1100, 1200 and 1300° C., the Sr-ferrite phase is successfully formed completely in the samples. The morphological examination for these samples are shown in FIG. 14. As the data show, the grain size was increased drastically as the firing temperature was increased from 1100 to 1300° C. Grain shape of the synthesized strontium ferrite also exhibited more crystalline hexagonal structure with increased firing temperature. As shown in FIGS. 15A and 15B, the energy product was seen to increase with increasing the firing temperature up to 1200° C., but decreased with increasing the reaction temperature to 1300° C. Again, without wishing to be bound by a particular theory, it is believed that this trend is also due to the formation of multi-domain and the easy movement of the domain walls, which result in domain misalignment that decreases the energy product value.

The comparative energy product values for all the prepared strontium ferrite samples at various reaction conditions showed that the highest energy product value for samples measured at 300 K is about 2.3 MGOe, and about 2.4 MGOe for samples measured at 4.2 K. The highest energy product values were by the sample prepared with a 1/12 Sr/Fe ratio, calcination at 1000° C. for 12 hrs, and firing at 1200° C. for 4 hrs.

As the results show, hard magnetic material in powder shape (Sr-ferrite) can be successfully synthesized through a ceramic preparation route using steelmaking by-product.

Moreover, according to some aspects of the disclosure, the magnetic properties can be enhanced gradually by increasing the mixing ratio (Sr/Fe) up to stoichiometric ratio, increasing the calcination time up to 12 hrs, increasing the firing time up to 4 hrs, or increasing the firing temperature up to 1200° C.

The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for making a hard magnetic powder of a general formula $MFe_xO_y$, the method comprising:
   a) providing an iron oxide fine, wherein the iron oxide fine comprises at least one member selected from the group consisting of magnetite, limonite, siderite, iron pyrite and goethite;
   b) providing a metal carbonate of a general formula $M_x(CO_3)_y$;
   c) mixing the iron oxide fine and the metal carbonate to form a mixture;
   d) calcining the mixture of the iron oxide fine and the metal for 4 to 12 hours at a temperature of at least 1000° C.;
   wherein M is a divalent metal ion;
   wherein the calcined mixture is re-milled in a dry atmosphere and then fired at about 1100 to 1300° C. for about 2 to 6 hours with a heating rate of 10° C. $\text{min}^{-1}$ in air atmosphere to form the hard magnetic powder.

2. The method of claim 1, wherein the iron oxide fine is a by-product of an iron processing or iron making process.

3. The method of claim 1, wherein the iron oxide fine comprises the siderite.

4. The method of claim 1, wherein M is strontium.

5. The method of claim 1, wherein $M_x(CO_3)_y$ is $SrCO_3$.

6. The method of claim 1, wherein the mixture is calcined for about 4 hours.

7. The method of claim 1, wherein M is strontium; and $Fe_xO_y$ is $Fe_{12}O_{19}$.

8. The method of claim 1, wherein the hard magnetic powder is a ferrite.

9. The method of claim 1, wherein the iron oxide fine comprises at least one member selected from the group consisting of magnetite, limonite, siderite, iron pyrite and goethite.

10. The method of claim 1, wherein the hard magnetic powder is hexagonal ferrites; M is strontium; and $Fe_xO_y$ is $Fe_{12}O_{19}$.

11. The method of claim 1, wherein the iron oxide fine comprises at least one member selected from the group consisting of limonite, siderite, iron pyrite and goethite.

12. The method of claim 1, wherein the iron oxide fine comprises at least one member selected from the group consisting of siderite, iron pyrite and goethite.

13. The method of claim 1, wherein the iron oxide fine further comprises at least about 93 wt % $Fe_2O_3$.

14. The method of claim 1, wherein no preheating step is required for the iron oxide fine.

15. A method for making a hard magnetic powder of a general formula MFexOy, the method comprising:
   a) forming a pre-blend by mixing an iron oxide fine; and a metal carbonate of a general formula $M_x(CO_3)_y$;
   b) milling the preblend to form a blended powder mixture; and
   c) calcining the blended powder mixture at a temperature of at least 1000° C. for about 4 hours; wherein M is a divalent metal ion; wherein the calcined mixture is re-milled in a dry atmosphere before firing the calcined mixture, and firing the calcined mixture at from 1100° C. to 1200° C. for 4 to 12 hours to produce the hard magnetic powder;
   wherein the iron oxide fine comprises at least one member selected from the group consisting of magnetite, limonite, siderite, iron pyrite and goethite.

16. The method according to claim 1, wherein the hard magnetic powder has a BH of from 1 to 3.0 MGOe at 300 K.

* * * * *